United States Patent
Tamaoka et al.

(10) Patent No.: US 8,675,304 B2
(45) Date of Patent: Mar. 18, 2014

(54) DISK DRIVE SPINDLE MOTOR WITH HOLE VOLUME AND COMPONENT DENSITY RELATIONSHIP

(75) Inventors: Takehito Tamaoka, Kyoto (JP); Kazushi Miura, Kyoto (JP); Mitsuhiro Takemoto, Kyoto (JP)

(73) Assignee: Nidec Corporation, Kyoto (JP)

( * ) Notice: Subject to any disclaimer, the term of this patent is extended or adjusted under 35 U.S.C. 154(b) by 104 days.

(21) Appl. No.: 13/353,557

(22) Filed: Jan. 19, 2012

(65) Prior Publication Data

US 2012/0250183 A1  Oct. 4, 2012

(30) Foreign Application Priority Data

Mar. 31, 2011 (JP) ................................ 2011-080144
Aug. 5, 2011 (JP) ................................ 2011-171771

(51) Int. Cl.
| | | |
|---|---|---|
| *G11B 19/20* | (2006.01) | |
| *G11B 25/04* | (2006.01) | |
| *H02K 5/04* | (2006.01) | |
| *H02K 5/16* | (2006.01) | |
| *H02K 5/24* | (2006.01) | |
| *F16C 17/10* | (2006.01) | |
| *F16C 33/10* | (2006.01) | |

(52) U.S. Cl.
USPC .................. 360/99.08; 310/67 R; 310/90

(58) Field of Classification Search
USPC .......... 360/99.08, 98.07, 99.04; 310/67 R, 90
See application file for complete search history.

(56) References Cited

U.S. PATENT DOCUMENTS

| | | |
|---|---|---|
| 5,880,545 A | 3/1999 | Takemura et al. |
| 6,991,376 B2 | 1/2006 | Aiello et al. |
| 2004/0090702 A1 | 5/2004 | Aiello et al. |
| 2006/0126979 A1* | 6/2006 | Uenosono et al. ............ 384/100 |
| 2006/0182374 A1 | 8/2006 | Schwamberger et al. |
| 2007/0030591 A1 | 2/2007 | Engesser et al. |
| 2007/0133911 A1 | 6/2007 | Nishimoto et al. |

(Continued)

FOREIGN PATENT DOCUMENTS

| | | |
|---|---|---|
| JP | 08-275435 A | 10/1996 |
| JP | 2003-056555 A | 2/2003 |

(Continued)

OTHER PUBLICATIONS

Mizukami et al., "Motor and Storage Disk Drive," Chinese Patent Application No. 201210021666.6, filed Jan. 31, 2012.

(Continued)

*Primary Examiner* — Craig A. Renner
(74) *Attorney, Agent, or Firm* — Keating & Bennett, LLP

(57) ABSTRACT

A motor includes a stationary portion and a rotating portion. The rotating portion includes a sleeve portion including one communicating hole arranged to extend completely there through from an upper surface to a lower surface thereof, and a cover portion including a hole portion. The axial extension range of the hole portion is arranged to overlap with the axial extension range of the communicating hole in a radial direction. A center of the hole portion is arranged on a plane including a central axis and a center of the communicating hole. The communicating hole and the hole portion are arranged on opposite sides of the central axis. The following inequality is satisfied: $V_2 < (\sigma_1/\sigma_2) \cdot V_1$, where $\sigma_1$ is the density of the sleeve portion, $V_1$ is the volume of the communicating hole, $\sigma_2$ is the density of the cover portion, and $V_2$ is the volume of the hole portion.

23 Claims, 15 Drawing Sheets

(56) References Cited

U.S. PATENT DOCUMENTS

| | | |
|---|---|---|
| 2008/0187257 A1 | 8/2008 | Engesser et al. |
| 2008/0292228 A1 | 11/2008 | Yamashita et al. |
| 2009/0140587 A1 | 6/2009 | Popov et al. |
| 2010/0124387 A1 | 5/2010 | Fuss et al. |
| 2010/0142869 A1 | 6/2010 | Grantz et al. |
| 2010/0266225 A1 | 10/2010 | Yamashita et al. |
| 2011/0192210 A1 | 8/2011 | Yamashita et al. |

FOREIGN PATENT DOCUMENTS

| | | |
|---|---|---|
| JP | 2003-061295 A | 2/2003 |
| JP | 2006-105390 A | 4/2006 |
| JP | 2007-162759 A | 6/2007 |
| JP | 2009-136143 A | 6/2009 |
| JP | 2010-121775 A | 6/2010 |
| KR | 10-2010-0064349 A | 6/2010 |

OTHER PUBLICATIONS

Mizukami et al., "Spindle Motor and Storage Disk Drive," U.S. Appl. No. 13/198,776, filed Aug. 5, 2011.
Mizukami et al., "Spindle Motor and Storage Disk Drive," U.S. Appl. No. 13/198,784, filed Aug. 5, 2011.
Mizukami et al., "Spindle Motor and Storage Disk Drive," U.S. Appl. No. 13/198,787, filed Aug. 5, 2011.
Mizukami et al., "Spindle Motor and Storage Disk Drive," U.S. Appl. No. 13/198,793, filed Aug. 5, 2011.
Mizukami et al., "Spindle Motor and Storage Disk Drive," U.S. Appl. No. 13/198,794, filed Aug. 5, 2011.
Mizukami et al., "Spindle Motor and Storage Disk Drive," U.S. Appl. No. 13/198,797, filed Aug. 5, 2011.
Yamaguchi et al., "Method of Manufacturing Fluid Dynamic Bearing Mechanism, Motor, and Storage Disk Drive," U.S. Appl. No. 13/353,554, filed Jan. 19, 2012.
Yamamoto et al., "Spindle Motor and Storage Disk Drive," U.S. Appl. No. 13/353,563, filed Jan. 19, 2012.

* cited by examiner

DISK DRIVE SPINDLE MOTOR WITH HOLE VOLUME AND COMPONENT DENSITY RELATIONSHIP

BACKGROUND OF THE INVENTION

1. Field of the Invention

The present invention relates to an electric motor.

2. Description of the Related Art

Motors including a bearing mechanism using fluid dynamic pressure are known and have often been used in storage disk drives. An example of a dynamic pressure fluid bearing apparatus in a spindle motor is disclosed in JP-A 2007-162759 and includes a shaft body and a tubular sleeve body inside which the shaft body is inserted. The shaft body is fixed to a base plate of the motor. The sleeve body is fixed to a rotor of the motor. The shaft body is provided with a first and a second thrust flange. The first and second thrust flanges are both annular and are arranged on an upper and a lower side of the sleeve body, respectively. In the dynamic pressure fluid bearing apparatus, a radial bearing portion is defined between the shaft body and the sleeve body, and a thrust bearing portion is defined between each of the two thrust flanges and the sleeve body. In addition, the sleeve body includes communicating holes defined therein to provide communication between two thrust gaps. Tapered seal portions are defined in the vicinity of upper and lower end openings of the communicating holes.

Another example of a fluid dynamic bearing motor which is disclosed in U.S. Pat. No. 6,991,376 includes a shaft, a top plate, a bottom plate, and a hub. The top plate and the bottom plate are fixed to an upper end and a lower end of the shaft, respectively. The hub is arranged between the top plate and the bottom plate, and is supported so as to be rotatable with respect to the shaft. The hub includes a recirculation channel extending therethrough defined therein. An upper portion of the hub includes a projecting portion arranged radially outward of an outer edge portion of the top plate. A capillary seal is defined between the projecting portion and the outer edge portion of the top plate. A lower portion of the hub includes another projecting portion arranged radially outward of an outer edge portion of the bottom plate. A capillary seal is also defined between the other projecting portion and the outer edge portion of the bottom plate. Influence of a pressure gradient of a lubricating oil in each of the capillary seals is minimized by the recirculation channel being arranged radially inward of the capillary seals.

SUMMARY OF THE INVENTION

However, a rotating portion of a motor in which only one communicating hole is provided has an asymmetrical mass distribution with respect to a central axis of the motor, which results in unbalance of the rotating portion. A displacement of the center of gravity of the rotating portion from the central axis may cause the motor and potentially a storage disk drive including the motor as well to experience a vibration during rotation of the motor.

A motor according to a preferred embodiment of the present invention includes a stationary portion including a stator, and a rotating portion. The stationary portion preferably includes a shaft portion, a lower plate portion, and an outer tubular portion. The lower plate portion is arranged to extend radially outward from a lower portion of the shaft portion. The outer tubular portion is arranged to extend upward from an outer edge portion of the lower plate portion. The rotating portion preferably includes a sleeve portion and a cover portion. The sleeve portion includes one communicating hole arranged to extend therethrough from an upper surface to a lower surface thereof. The cover portion is arranged to extend radially outward from the sleeve portion.

An outer circumferential surface of the shaft portion and an inner circumferential surface of the sleeve portion are arranged to together define a first gap therebetween. An inner circumferential surface of the outer tubular portion and an outer circumferential surface of the sleeve portion are arranged to together define a second gap therebetween. A channel including the first and second gaps and the communicating hole is filled with a lubricating oil.

The cover portion includes a hole portion defined therein. An axial extension range of the hole portion is arranged to overlap with an axial extension range of the communicating hole. A center of the hole portion is arranged on a plane including a central axis and a center of the communicating hole. The communicating hole and the hole portion are arranged on opposite sides of the central axis.

The following inequality is satisfied: $V_2 > (\sigma_1/\sigma_2) \cdot V_1$, where $\sigma_1$ is a density of the sleeve portion, $V_1$ is a volume of the communicating hole, $\sigma_2$ is a density of the cover portion, and $V_2$ is a volume of the hole portion.

A motor according to another preferred embodiment of the present invention includes a stationary portion and a rotating portion. The stationary portion preferably includes a shaft portion, a lower plate portion, and an outer tubular portion. The shaft portion is arranged to have a central axis extending in a vertical direction as a center thereof. The lower plate portion is arranged to extend radially outward from a lower portion of the shaft portion. The outer tubular portion is arranged to extend upward from an outer edge portion of the lower plate portion. The rotating portion preferably includes a sleeve portion and a cover portion. The sleeve portion includes one communicating hole arranged to extend therethrough from an upper surface to a lower surface thereof. The cover portion is arranged to extend radially outward from the sleeve portion.

An outer circumferential surface of the shaft portion and an inner circumferential surface of the sleeve portion are arranged to together define a first gap therebetween. An inner circumferential surface of the outer tubular portion and an outer circumferential surface of the sleeve portion are arranged to together define a second gap therebetween. A channel including the first and second gaps and the communicating hole is filled with a lubricating oil.

The cover portion includes two hole portions having the same or substantially the same size defined therein. An axial extension range of each of the hole portions is arranged to overlap with an axial extension range of the communicating hole.

The hole portions are arranged to be symmetrical with respect to a plane including the central axis and a center of the communicating hole. The communicating hole and a pair of the hole portions are arranged on opposite sides of the central axis.

The following inequality is satisfied: $V_2 \cdot \cos\theta < (\sigma_1/\sigma_2) \cdot V_1$, where $\sigma_1$ is a density of the sleeve portion, $V_1$ is a volume of the communicating hole, $\sigma_2$ is a density of the cover portion, $V_2$ is a total volume of the hole portions, and $\theta$ is an angle defined between the plane including the central axis and the center of the communicating hole and a plane including the central axis and a center of one of the hole portions.

A motor according to yet another preferred embodiment of the present invention includes a stationary portion and a rotating portion. The stationary portion preferably includes a shaft portion, a lower plate portion, and an outer tubular portion.

The shaft portion is arranged to have a central axis extending in a vertical direction as a center thereof. The lower plate portion is arranged to extend radially outward from a lower portion of the shaft portion. The outer tubular portion is arranged to extend upward from an outer edge portion of the lower plate portion. The rotating portion preferably includes a sleeve portion and a cover portion. The sleeve portion includes one communicating hole arranged to extend therethrough from an upper surface to a lower surface thereof. The cover portion is arranged to extend radially outward from the sleeve portion.

An outer circumferential surface of the shaft portion and an inner circumferential surface of the sleeve portion are arranged to together define a first gap therebetween. An inner circumferential surface of the outer tubular portion and an outer circumferential surface of the sleeve portion are arranged to together define a second gap therebetween. A channel including the first and second gaps and the communicating hole is filled with a lubricating oil.

The cover portion includes a total of k hole portions defined therein where k is a natural number. An axial extension range of each of the k hole portions is arranged to overlap with an axial extension range of the communicating hole.

The following inequality is satisfied:

$$\left| \sum_{i=1}^{k} \sigma_2 V_{2i} vr_{2i} + \sigma_1 V_1 vr_1 \right| < |\sigma_1 V_1 vr_1|$$

where $\sigma_1$ is a density of the sleeve portion, $V_1$ is a volume of the communicating hole, $vr_1$ is a vector from the central axis to a center of the communicating hole in a plan view, $\sigma_2$ is a density of the cover portion, $V_{2i}$ is a volume of an ith hole portion, and $vr_{2i}$ is a vector from the central axis to a center of the ith hole portion in the plan view.

The preferred embodiments of the present invention are able to prevent and reduce vibrations of a motor during rotation of the motor.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

It is assumed herein that an upper side and a lower side in a direction parallel or substantially parallel to a central axis of a motor are referred to as an "upper side" and a "lower side", respectively. Note that the terms "vertical direction", "upper side", "lower side", and the like as used herein are not meant to indicate relative positions or directions of different members or portions when actually installed in a device. Also note that directions parallel to or substantially parallel to the central axis are referred to by the term "axial direction", "axial", or "axially", that radial directions centered on the central axis are simply referred to by the term "radial direction", "radial", or "radially", and that a circumferential direction about the central axis is simply referred to by the term "circumferential direction", "circumferential", or "circumferentially".

Figure 1:
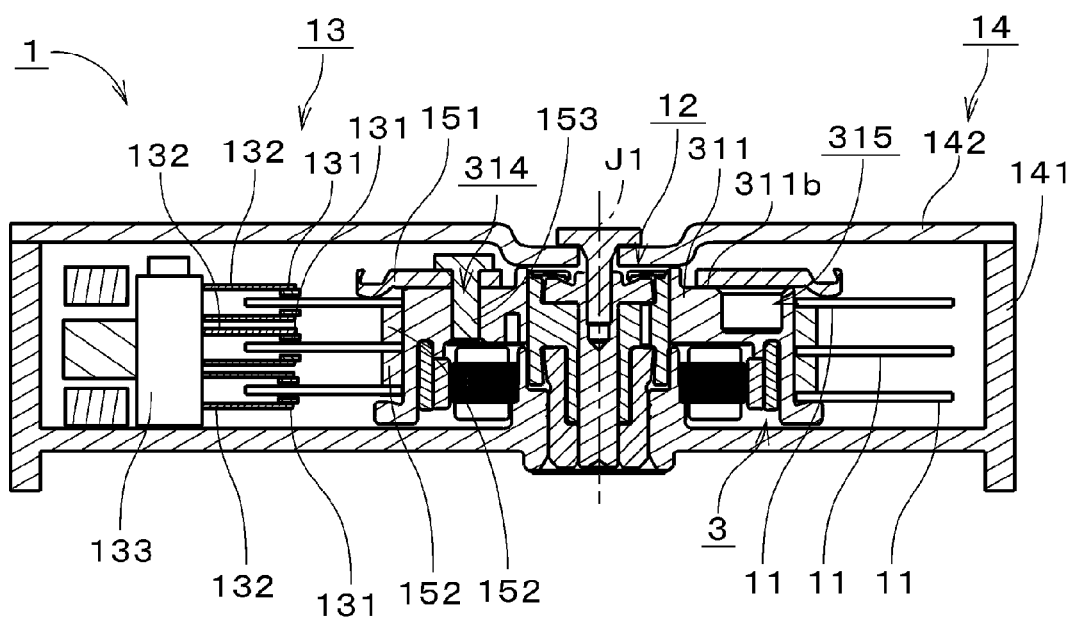
FIG. 1 is a cross-sectional view of a storage disk drive according to a first preferred embodiment of the present invention.

FIG. 1 is a vertical cross-sectional view of a storage disk drive 1 including a spindle motor (hereinafter referred to simply as a "motor") 12 according to a first preferred embodiment of the present invention. The storage disk drive 1 is preferably a so-called hard disk drive. The storage disk drive 1 preferably includes three disks 11, the motor 12, an access portion 13, and a housing 14, for example. The motor 12 is arranged to rotate the disks 11, in which information is stored. The access portion 13 is arranged to perform at least one of reading and writing of information from or to the disks 11.

The housing 14 preferably includes a first housing member 141 and a second housing member 142. The second housing member 142 is arranged in the shape of a flat plate. The disks 11, the motor 12, and the access portion 13 are arranged inside the first housing member 141. The second housing member 142 is arranged to be fitted to the first housing member 141 to define the housing 14. An interior space of the storage disk drive 1 is preferably a clean space with no or only an extremely small amount of dirt or dust. In the present preferred embodiment, air is arranged in the interior space of the storage disk drive 1. Note that the interior space of the storage disk drive 1 may alternatively be filled with a helium gas, a hydrogen gas, or a mixture of either or both of these gases and air if so desired.

The three disks 11 are clamped to a rotor hub of the motor 12 through a clamper 151 and spacers 152 such that the disks 11 are arranged at regular intervals in a direction parallel or substantially parallel to a central axis J1 of the motor 12. The access portion 13 preferably includes six heads 131, six arms 132, and a head actuator mechanism 133. Each of the heads 131 is arranged in close proximity to one of the disks 11 to magnetically perform at least one of the reading and the writing of information from or to the disk 11. Each of the arms 132 is arranged to support an associated one of the heads 131. The head actuator mechanism 133 is arranged to actuate each of the arms 132 to move an associated one of the heads 131 relative to an associated one of the disks 11. The above mechanism enables the head 131 to make access to a desired location on the rotating disk 11 with the head 131 being arranged in close proximity to the disk 11. Note that the number of disks 11 is not limited to three, but may be one, two, or any other number more than three.

Figure 2:
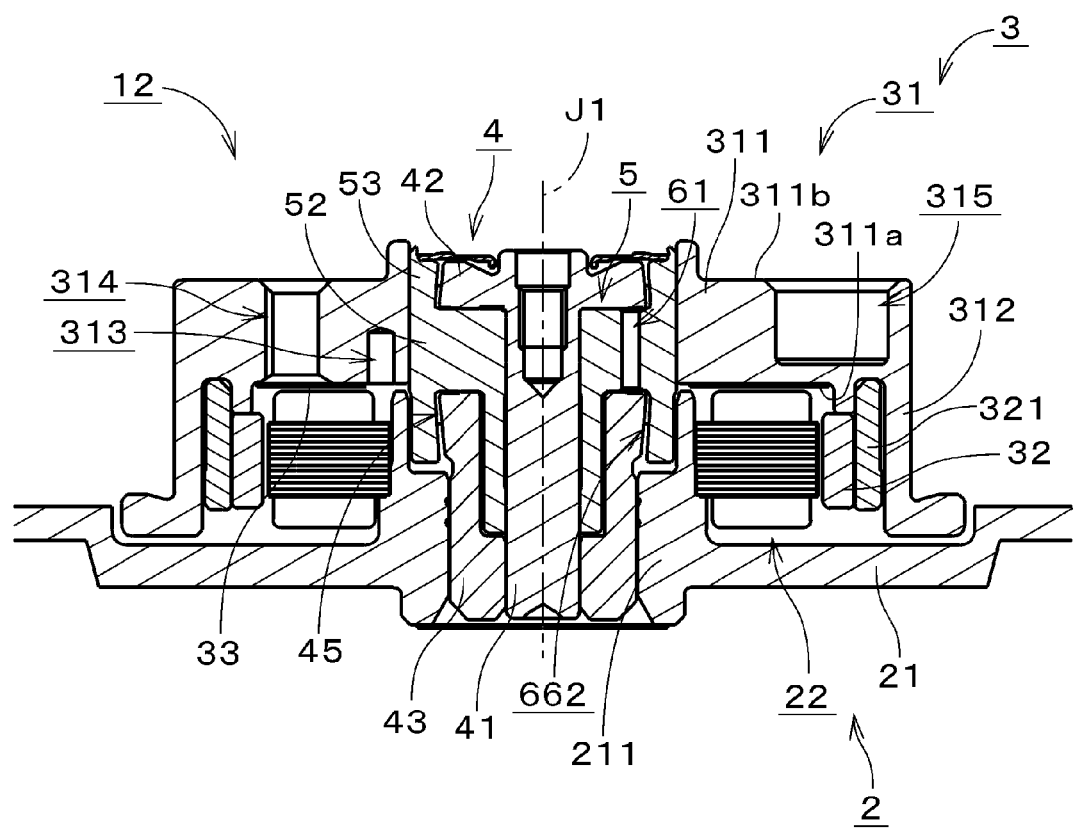
FIG. 2 is a cross-sectional view of a motor according to the first preferred embodiment of the present invention.

FIG. 2 is a vertical cross-sectional view of the motor 12. The motor 12 is preferably an outer-rotor motor. The motor 12 includes a stationary portion 2 and a rotating portion 3. In FIG. 2, a fluid dynamic bearing mechanism (hereinafter referred to as a "bearing mechanism"), which is defined by a portion of the stationary portion 2 and a portion of the rotating portion 3, is indicated by reference numeral "4". The rotating portion 3 is supported through a lubricating oil 45 such that the rotating portion 3 is rotatable about the central axis J1 of the motor 12 with respect to the stationary portion 2.

The stationary portion 2 preferably includes a base plate 21, i.e., a base portion, a stator 22, a shaft portion 41, an upper thrust portion 42, and a lower thrust portion 43. The base plate 21 and the first housing member 141 illustrated in FIG. 1 are defined by a single continuous monolithic member, and are arranged to define a portion of the housing 14. The stator 22 is fixed to a circumference of a cylindrical holder 211 defined in the base plate 21. A hole portion is defined inside the holder 211. Note that the base plate 21 and the first housing member 141 may alternatively be defined by separate members if so desired.

The rotating portion 3 preferably includes a rotor hub 31, a rotor magnet 32, and a yoke 321. The rotor hub 31 preferably includes a substantially cylindrical sleeve portion 5, a cover portion 311, and a cylindrical portion 312. The sleeve portion 5 is preferably made of, for example, stainless steel. More preferably, the sleeve portion 5 is made of a ferritic stainless steel, such as, for example, SUS430. The cover portion 311 and the cylindrical portion 312 are preferably defined by a single continuous monolithic member. Each of the cover portion 311 and the cylindrical portion 312 is preferably made of, for example, aluminum, and has a density lower than that of the sleeve portion 5. The cover portion 311 is arranged to extend radially outward from the sleeve portion 5.

The cover portion 311 preferably includes an adjusting hole portion 313, screw holes 314, and turn preventing holes 315 defined therein. The adjusting hole portion 313 is defined by a non-through hole (i.e., a blind hole). Each of the screw holes 314 is used to fix the clamper 151 illustrated in FIG. 1. The number of adjusting hole portions 313 is preferably one. The adjusting hole portion 313 is arranged to extend from a lower surface 311a of the cover portion 311 up to a vicinity of an upper surface 311b of the cover portion 311. The adjusting hole portion 313 is arranged over the stator 22, and is arranged to be closer to the central axis J1 than are the screw holes 314. Each of the screw holes 314 is arranged to extend in a vertical direction through the cover portion 311. In the present preferred embodiment, the number of screw holes 314 is preferably four, and the screw holes 314 are preferably arranged at regular intervals in a circumferential direction, for example. Similarly, the number of turn preventing holes 315 is preferably four, and the turn preventing holes 315 are preferably arranged at regular intervals in the circumferential direction, for example. The screw holes 314 are arranged to fix the clamper 151, which is used to clamp the disks 11, to the upper surface 311b of the cover portion 31.

Referring to FIG. 1, when the clamper 151 is attached to the motor 12, screws 153 are inserted into through holes defined in the clamper 151 and the screw holes 314 to fix the clamper 151 to the upper surface 311b of the cover portion 311. At this time, portions of a jig, for example, are inserted into the turn preventing holes 315 to substantially prevent a turning of the rotating portion 3. Referring to FIG. 2, a sheet member 33 is preferably attached to the lower surface 311a of the cover portion 311 to close a lower end of each screw hole 314. It is preferable, however, that the sheet member 33 should not be arranged at or around the adjusting hole portion 313 in order to expose the adjusting hole portion 313 from the sheet member 33. The closing of the lower end of each screw hole 314 with the sheet member 33 works to prevent metal chips, which may be produced in the screw hole 314 when the screw hole 314 is formed or when the screw 153 as illustrated in FIG. 1 is inserted into the screw hole 314, from entering into an interior of the motor 12.

The cylindrical portion 312 is arranged to extend downward from an outer edge portion of the cover portion 311. The rotor magnet 32 is fixed inside the cylindrical portion 312 with the yoke 321 intervening therebetween. The rotor magnet 32 is arranged radially opposite the stator 22. A torque is generated between the stator 22 and the rotor magnet 32.

Figure 3:
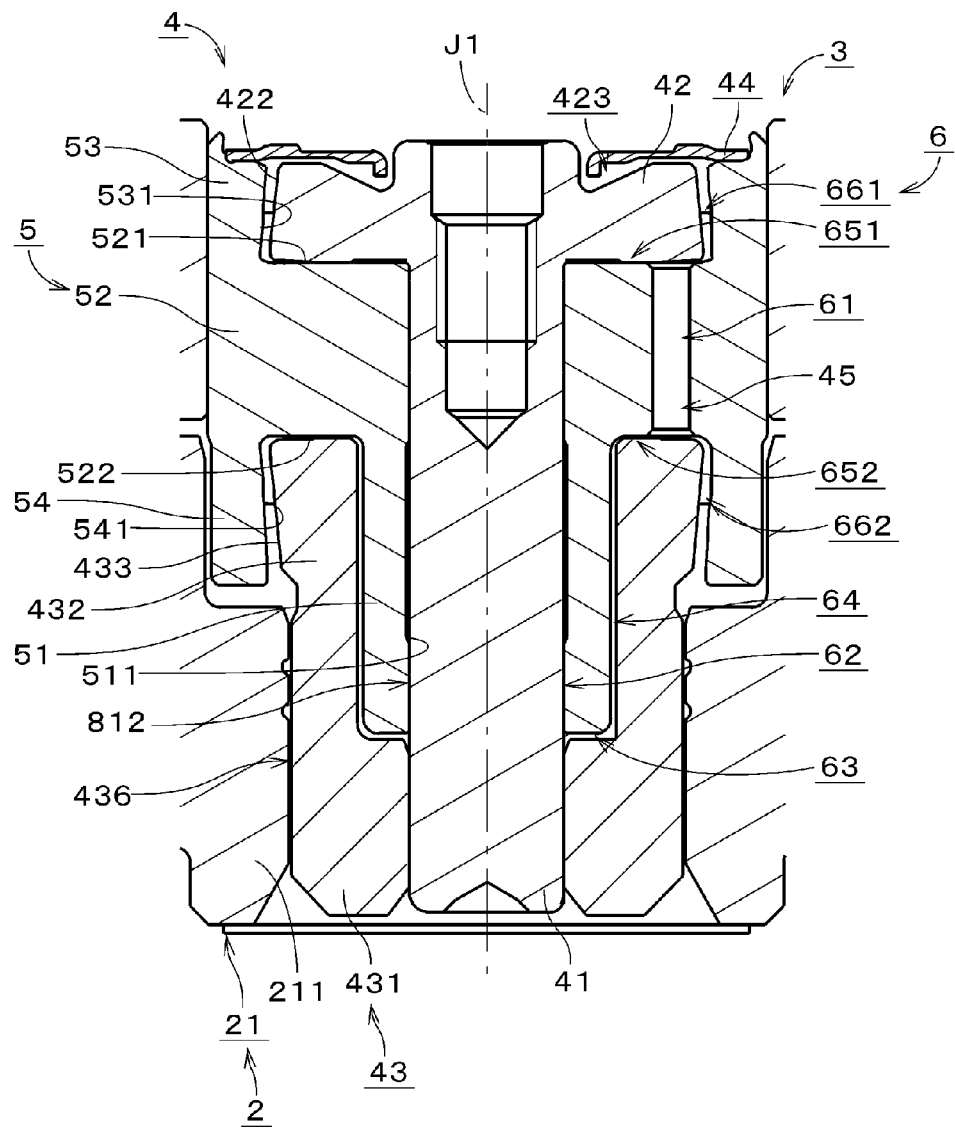
FIG. 3 is a cross-sectional view of a bearing mechanism according to the first preferred embodiment of the present invention.

FIG. 3 is an enlarged view of the bearing mechanism 4. The bearing mechanism 4 preferably includes the shaft portion 41, the upper thrust portion 42, the lower thrust portion 43, the sleeve portion 5, a seal cap 44, and the lubricating oil 45. As mentioned above, each of the shaft portion 41, the upper thrust portion 42, and the lower thrust portion 43 defines a portion of the stationary portion 2, while the sleeve portion 5 defines a portion of the rotating portion 3. The shaft portion 41 is preferably press fitted and fixed to a hole portion defined inside the lower thrust portion 43. The shaft portion 41 is arranged to orient in the vertical direction along the central axis J1. The upper thrust portion 42 is preferably arranged substantially in the shape of a flat plate, and is preferably arranged to extend radially outward from an upper portion of the shaft portion 41. The shaft portion 41 and the upper thrust portion 42 are preferably defined by a single continuous monolithic member. The shaft portion 41 and the upper thrust portion 42 are preferably made of stainless steel or the like, for example. An outer circumferential surface 422 of the upper thrust portion 42 includes an inclined surface that is angled in a radially inward direction with increasing height. The upper thrust portion 42 includes a shoulder portion 423 recessed downward and defined in an inner edge portion of an upper surface thereof.

The lower thrust portion 43 includes a lower plate portion 431 and an outer tubular portion 432. The lower thrust portion 43 is preferably made of copper, high-strength brass, or the like, for example. The lower plate portion 431 is arranged to extend radially outward from a lower portion of the shaft portion 41. The outer tubular portion 432 is arranged to extend upward from an outer edge portion of the lower plate portion 431. An upper portion of an outer circumferential surface of the outer tubular portion 432 includes an inclined surface 433 that is angled in the radially inward direction with decreasing height.

In assembling the motor 12, a lower portion of the outer circumferential surface of the outer tubular portion 432 is fixed to an inner circumferential surface of the holder 211 of the base plate 21 preferably through, for example, an adhesive. In comparison to press fitting, the above method enables the vertical positioning of the outer tubular portion 432 relative to the base plate 21 to be achieved with greater precision, whereby improved precision in the height of the motor 12 is achieved.

The sleeve portion 5 preferably includes an inner tubular portion 51, a flange portion 52, an upper hub tubular portion 53, and a lower hub tubular portion 54. The inner tubular portion 51 is arranged in a substantially cylindrical space that is defined between the outer tubular portion 432 and the shaft portion 41. The flange portion 52 is arranged on an upper side of the outer tubular portion 432, and is arranged to project radially outward from an upper portion of the inner tubular portion 51. Note that, in the following description, a portion that can be considered as either an inner circumferential portion of the flange portion 52 or the upper portion of the inner tubular portion 51 is regarded as a portion of the inner tubular portion 51. The axial thickness of the flange portion 52 is preferably arranged to be about one half, one half, or less than about one half of the axial dimension of an inner circumferential surface 511 of the inner tubular portion 51. Both an upper surface 521 and a lower surface 522 of the flange portion 52 are preferably arranged to be perpendicular or substantially perpendicular to the central axis J1. The flange portion 52 includes a communicating hole 61 arranged to extend in the vertical direction through the flange portion 52. The number of communicating holes 61 is preferably one in the present preferred embodiment, for example.

The upper hub tubular portion 53 is arranged substantially in the shape of a cylinder, and is arranged to extend upward from an outer edge portion of the flange portion 52. The upper hub tubular portion 53 is arranged radially outward of the upper thrust portion 42. An inner circumferential surface 531 of the upper hub tubular portion 53 includes a portion that is angled in the radially inward direction with increasing height. Referring to FIG. 2, the cover portion 311 of the rotor hub 31 is arranged to extend radially outward from the outer edge portion of the flange portion 52 and the upper hub tubular portion 53.

The lower hub tubular portion 54 illustrated in FIG. 3 is arranged substantially in the shape of a cylinder, and is arranged to extend downward from the outer edge portion of the flange portion 52. The lower hub tubular portion 54 is arranged radially outward of the outer tubular portion 432 of the lower thrust portion 43. An inner circumferential surface 541 of the lower hub tubular portion 54 preferably includes a portion that is angled in the radially inward direction with decreasing height. Note that each of the upper and lower hub tubular portions 53 and 54 may be defined by a member provided independently from the flange portion 52 if so desired.

The seal cap 44 is preferably arranged to be annular and centered on the central axis J1. The seal cap 44 is fixed to an upper end portion of the upper hub tubular portion 53 preferably through, for example, press fitting and/or adhesion. The seal cap 44 is arranged to extend radially inward from the upper hub tubular portion 53, and a radially inner portion of the seal cap 44 is arranged over the shoulder portion 423.

Referring to FIG. 2, the rotating portion 3, which includes the sleeve portion 5, is arranged to rotate through the lubricating oil 45 with respect to the shaft portion 41, the upper thrust portion 42, and the lower thrust portion 43 while the motor 12 is driven.

Figure 4:
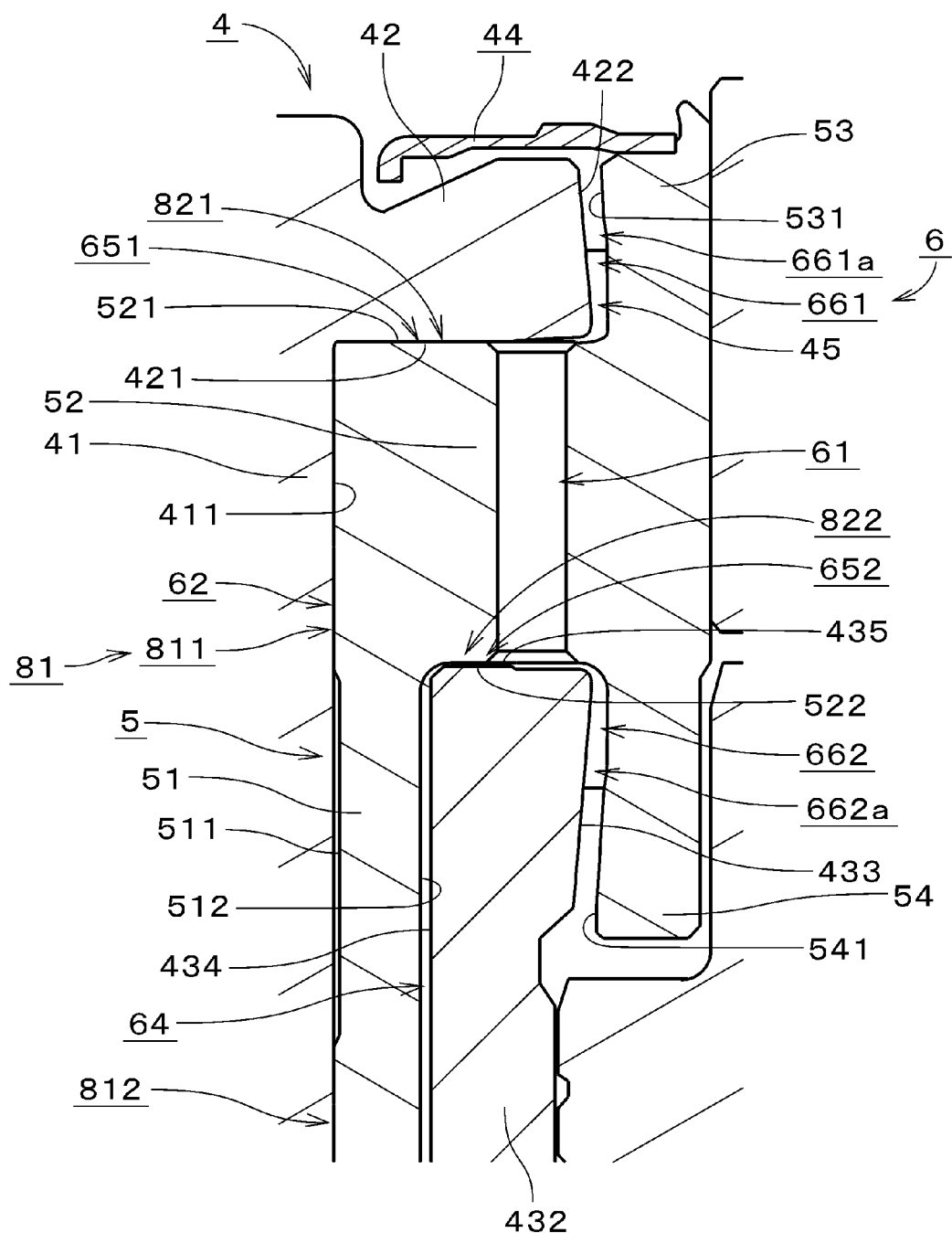
FIG. 4 is a cross-sectional view of the bearing mechanism according to the first preferred embodiment of the present invention.

FIG. 4 is an enlarged view of an upper portion of the bearing mechanism 4. An outer circumferential surface 411 of the shaft portion 41 is arranged radially opposite the inner circumferential surface 511 of the inner tubular portion 51, in which the shaft portion 41 is inserted. A radial gap 62 is defined between the shaft portion 41 and the inner tubular portion 51. The radial width of the radial gap 62 is preferably in the range of about 2 μm to about 4 μm, for example. Note that, in the present preferred embodiment, the radial gap 62 corresponds to a first gap. Referring to FIG. 3, an axial gap 63 is defined between a lower end of the inner tubular portion 51 and the lower plate portion 431. Hereinafter, the gap 63 will be referred to as a "lower end gap 63".

Referring to FIG. 4, a gap 64 in the shape of a cylinder is defined between an outer circumferential surface 512 of the inner tubular portion 51 and an inner circumferential surface 434 of the outer tubular portion 432. Hereinafter, the gap 64 will be referred to as a "cylindrical gap 64". Referring to FIG. 3, the cylindrical gap 64 is arranged to be in communication with the radial gap 62 through the lower end gap 63. The radial width of the cylindrical gap 64 is preferably greater than the radial width of the radial gap 62 and preferably smaller than the diameter of the communicating hole 61. Note that, in the present preferred embodiment, the cylindrical gap 64 corresponds to a second gap.

Referring to FIG. 4, a gap 651 is defined between a portion of the upper surface 521 of the flange portion 52 which is radially inward of the communicating hole 61 and a lower surface 421 of the upper thrust portion 42. Hereinafter, the gap 651 will be referred to as an "upper thrust gap 651". In addition, a gap 652 is defined between a portion of the lower surface 522 of the flange portion 52 which is radially inward of the communicating hole 61 and an upper surface 435 of the outer tubular portion 432. Hereinafter, the gap 652 will be referred to as a "lower thrust gap 652". The upper and lower thrust gaps 651 and 652 are arranged to be in communication with each other through the communicating hole 61. In the bearing mechanism 4, the radial gap 62, the lower end gap 63, the cylindrical gap 64, the upper and lower thrust gaps 651 and 652, and the communicating hole 61 are arranged in this order from a radial inside to a radial outside. Note that, in the present preferred embodiment, the lower thrust gap 652 corresponds to a third gap.

The inner circumferential surface 531 of the upper hub tubular portion 53 is arranged radially opposite the outer circumferential surface 422 of the upper thrust portion 42. A gap 661 is defined between the upper hub tubular portion 53 and the upper thrust portion 42. The gap 661 is preferably arranged radially outward of all of the radial gap 62, the upper thrust gap 651, and the communicating hole 61. The gap 661 is arranged to gradually increase in width with increasing height, that is, with decreasing distance from an upper end opening of the gap 661. Hereinafter, the gap 661 will be referred to as an "upper seal gap 661". Moreover, the upper seal gap 661 is arranged to be angled toward the central axis J1, that is, to the left in FIG. 4, with increasing height. A surface of the lubricating oil 45 is arranged inside the upper seal gap 661, and the lubricating oil 45 is retained in the upper seal gap 661 through capillary action. An upper seal portion 661a arranged to retain the lubricating oil 45 is defined in the upper seal gap 661 as described above. On an upper side of the surface of the lubricating oil 45 in the upper seal gap 661, oil-repellent films are preferably arranged on the inner circumferential surface 531 and the outer circumferential surface 422. The upper end opening of the upper seal gap 661 is covered with the seal cap 44.

The inner circumferential surface 541 of the lower hub tubular portion 54 is arranged radially opposite the inclined surface 433 of the outer tubular portion 432. A gap 662 is defined between the lower hub tubular portion 54 and the outer tubular portion 432. The gap 662 is arranged radially outward of all of the radial gap 62, the lower end gap 63, the cylindrical gap 64, the lower thrust gap 652, and the communicating hole 61. The gap 662 is arranged to gradually increase in width with decreasing height, that is, with decreasing distance from a lower end opening of the gap 662. Hereinafter, the gap 662 will be referred to as a "lower seal gap 662". Moreover, the lower seal gap 662 is arranged to be angled to the left in FIG. 4 with decreasing height. A surface of the lubricating oil 45 is arranged inside the lower seal gap 662, and a lower seal portion 662a arranged to retain the lubricating oil 45 through capillary action is defined in the lower seal gap 662. On a lower side of the surface of the lubricating oil 45 in the lower seal gap 662, oil-repellent films are arranged on the inner circumferential surface 541 and the inclined surface 433. In the bearing mechanism 4, the upper and lower seal gaps 661 and 662 are arranged to be in communication with each other through the communicating hole 61.

The axial distance between the surface of the lubricating oil 45 in the upper seal portion 661a and the surface of the lubricating oil 45 in the lower seal portion 662a is preferably shorter than the axial length of the radial gap 62. Moreover, the length of the communicating hole 61 is preferably shorter than the axial distance between the surface of the lubricating oil 45 in the upper seal portion 661a and the surface of the lubricating oil 45 in the lower seal portion 662a. It is assumed here that the distance between the surface of the lubricating oil 45 in the upper seal portion 661a and the surface of the lubricating oil 45 in the lower seal portion 662a refers to the distance between an upper end of the surface of the lubricating oil 45 in the upper seal portion 661a and a lower end of the surface of the lubricating oil 45 in the lower seal portion 662a.

Referring to FIG. 3, the outside diameter of the upper seal gap 661 is preferably equal or substantially equal to the outside diameter of the lower seal gap 662. This makes it possible to arrange the communicating hole 61 to extend in parallel or substantially in parallel with the central axis J1. It is assumed here that the outside diameter of the upper seal gap 661 refers to the outside diameter of an end of the upper seal gap 661 on a side closer to the upper thrust gap 651, and that the outside diameter of the lower seal gap 662 refers to the outside diameter of an end of the lower seal gap 662 on a side closer to the lower thrust gap 652.

In the bearing mechanism 4, a circulation channel including the upper thrust gap 651, the radial gap 62, the lower end gap 63, the cylindrical gap 64, the lower thrust gap 652, and the communicating hole 61, and, in addition to the circulation channel, the upper and lower seal gaps 661 and 662 are continuously filled with the lubricating oil 45. The circulation channel and the upper and lower seal gaps 661 and 662 will be hereinafter referred to collectively as a "channel 6".

When the lubricating oil 45 is fed into the bearing mechanism 4, the bearing mechanism 4 is turned upside down, and in this situation, the lubricating oil 45 is supplied into a portion of the lower seal gap 662 which is in the vicinity of the communicating hole 61. Notice here that the feeding of the lubricating oil 45 is preferably carried out after the bearing mechanism 4 is assembled, and that it is therefore impossible to directly identify the position of the communicating hole 61. However, referring to FIG. 2, the adjusting hole portion 313, the central axis J1, and the communicating hole 61 are arranged in this order on the same straight line, and the adjusting hole portion 313 is exposed from the sheet member 33. This makes it possible to easily identify the position of the communicating hole 61 in the bearing mechanism 4 based on the position of the adjusting hole portion 313. Once the position of the communicating hole 61 is identified, it is easy to supply the lubricating oil 45 to the portion of the lower seal gap 662 which is in the vicinity of the communicating hole 61 to accomplish the feeding of the lubricating oil 45 into the bearing mechanism 4. It is possible to control the amount of the lubricating oil 45 in the bearing mechanism 4 by visually identifying the height of the surface of the lubricating oil 45 in the lower seal gap 662. Note that the above-described method is not essential to the present invention, and that other methods which make it easy to identify the position of the communicating hole 61 may alternatively be used. For example, if the position of the communicating hole 61 is identified, the lubricating oil 45 may be supplied into a portion of the lower seal gap 662 which is located on an opposite side of the central axis J1 with respect to the communicating hole 61, i.e., on a side close to the adjusting hole portion 313.

Note that the visual identification may be conducted either with eyes alone or with a magnified view of the lower seal gap 662 with the aid of a device such as a microscope. Also note that the visual identification may be conducted with a magnified image of the lower seal gap 662 shown on a display screen with the aid of a magnification device.

Figure 5:
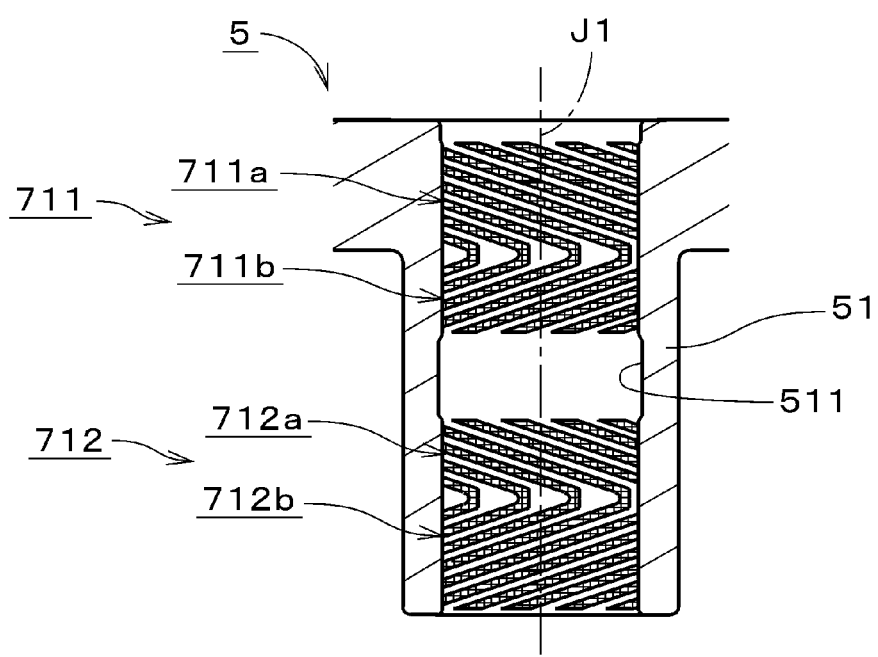
FIG. 5 is a cross-sectional view of a sleeve portion according to the first preferred embodiment of the present invention.

FIG. 5 is a cross-sectional view of the sleeve portion 5. In FIG. 5, the shape of an inner circumferential surface of the sleeve portion 5 is also depicted. The inner tubular portion 51 includes an upper radial dynamic pressure groove array 711 and a lower radial dynamic pressure groove array 712 defined in the inner circumferential surface 511 thereof. The upper radial dynamic pressure groove array 711 is arranged on an upper side of a substantial axial middle of the inner circumferential surface 511. The lower radial dynamic pressure groove array 712 is arranged on a lower side of the substantial axial middle of the inner circumferential surface 511. In FIG. 5, dynamic pressure grooves are indicated by cross-hatching. Also in other figures referenced below, dynamic pressure grooves are indicated by cross-hatching. The upper radial dynamic pressure groove array 711 preferably includes a collection of grooves arranged in a herringbone pattern, that is, a collection of a plurality of grooves each of which is arranged substantially in the shape of the letter "V" in horizontal orientation along a circumferential direction of the inner circumferential surface 511. The axial dimension of an upper portion of the upper radial dynamic pressure groove array 711 is preferably arranged to be greater than that of a lower portion of the upper radial dynamic pressure groove array 711. Hereinafter, the upper portion and the lower portion of the upper radial dynamic pressure groove array 711 will be referred to as a "groove upper portion 711a" and a "groove lower portion 711b", respectively. The lower radial dynamic pressure groove array 712 also preferably includes grooves arranged in the herringbone pattern. The axial dimension of a groove upper portion 712a of the lower radial dynamic pressure groove array 712 is preferably arranged to be smaller than that of a groove lower portion 712b of the lower radial dynamic pressure groove array 712.

The lower thrust gap 652 illustrated in FIG. 4 is arranged at a level higher than that of an upper end of the groove upper portion 712a of the lower radial dynamic pressure groove array 712. In the radial gap 62, a radial dynamic pressure bearing 81 arranged to generate a radial fluid dynamic pressure acting on the lubricating oil 45 is defined through the upper and lower radial dynamic pressure groove arrays 711 and 712. Hereinafter, an upper dynamic pressure bearing portion corresponding to the upper radial dynamic pressure groove array 711 will be referred to as an "upper radial dynamic pressure bearing portion 811". Meanwhile, a lower dynamic pressure bearing portion corresponding to the lower radial dynamic pressure groove array 712 will be hereinafter referred to as a "lower radial dynamic pressure bearing portion 812". The lower radial dynamic pressure bearing portion 812 is arranged to overlap in a radial direction with a fixing region 436 where the lower portion of the outer circumferential surface of the outer tubular portion 432 and the holder 211 of the base plate 21 illustrated in FIG. 3 are fixed to each other.

Note that it is sufficient that the level of the lower thrust gap 652 is arranged to be higher than that of the upper end of at least one of the dynamic pressure grooves defining the lower radial dynamic pressure groove array 712. Also note that the level of the lower thrust gap 652 may be arranged to be higher than that of the upper end of each of all the dynamic pressure grooves defining the lower radial dynamic pressure groove array 712. These arrangements fall within the scope of preferred embodiments of the present invention.

Figure 6:
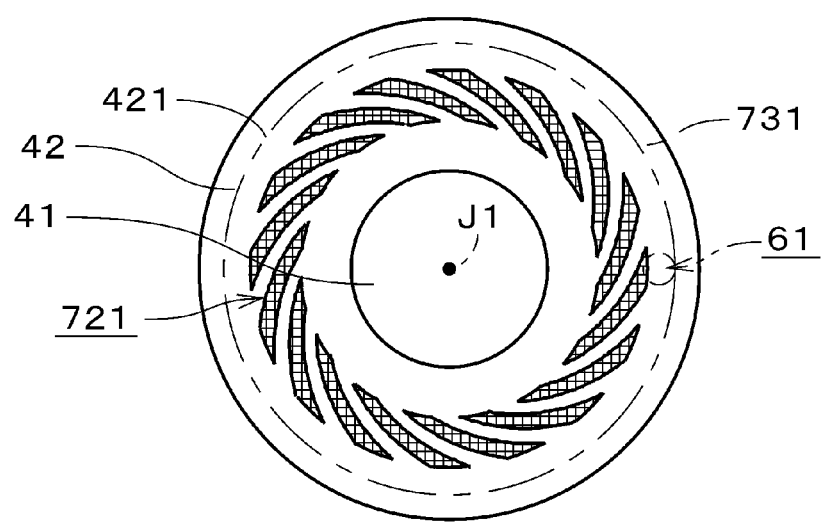
FIG. 6 is a bottom view of a shaft portion and an upper thrust portion according to the first preferred embodiment of the present invention.

FIG. 6 is a bottom view of the shaft portion 41 and the upper thrust portion 42. In FIG. 6, a position corresponding to the position of the communicating hole 61 is indicated by a chain double-dashed line. The same holds true for FIG. 7. The lower surface 421 of the upper thrust portion 42 includes an upper thrust dynamic pressure groove array 721 arranged in a spiral pattern defined therein. The upper thrust dynamic pressure groove array 721 is arranged radially inward of a circle 731 which is centered on the central axis J1 and which touches an upper end opening of the communicating hole 61 at a radially outer point. Note that, in the case where the upper end opening is provided with a chamfer portion, the upper thrust dynamic pressure groove array 721 is arranged radially inward of a circle which is centered on the central axis J1 and which touches the chamfer portion at a radially outer point. An outer edge portion of the upper thrust dynamic pressure groove array 721 is arranged to overlap with the upper end opening of the communicating hole 61. In the upper thrust gap 651 illustrated in FIG. 4, a dynamic pressure bearing portion 821, which is a dynamic pressure generation portion arranged to generate a fluid dynamic pressure acting on the lubricating oil 45 in a thrust direction, is defined through the upper thrust dynamic pressure groove array 721. Hereinafter, the dynamic pressure bearing portion 821 will be referred to as an "upper thrust dynamic pressure bearing portion 821".

Note that it is sufficient that at least one of dynamic pressure grooves that define the upper thrust dynamic pressure groove array 721 is arranged radially inward of the circle 731. Also note that all of the dynamic pressure grooves that define the upper thrust dynamic pressure groove array 721 may be arranged radially inward of the circle 731. These arrangements fall within the scope of preferred embodiments of the present invention.

Figure 7:
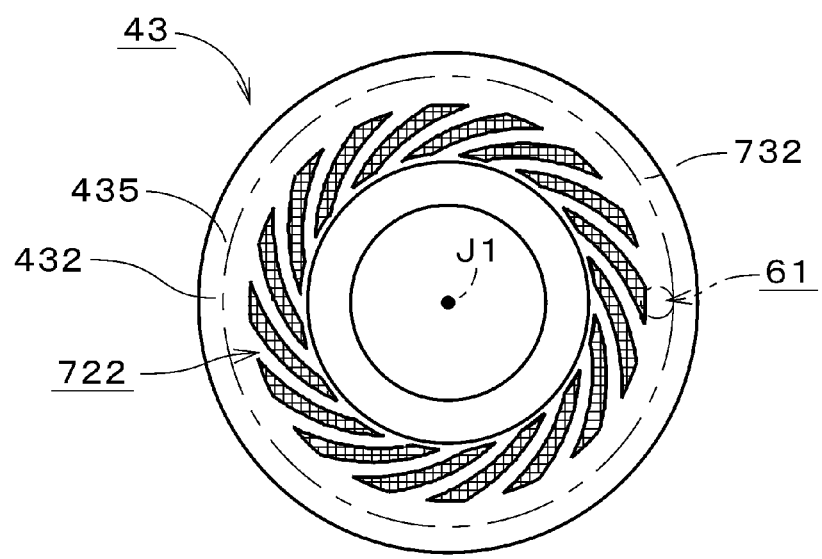
FIG. 7 is a plan view of a lower thrust portion according to the first preferred embodiment of the present invention.

FIG. 7 is a plan view of the lower thrust portion 43. The upper surface 435 of the outer tubular portion 432 includes a lower thrust dynamic pressure groove array 722 arranged in the spiral pattern defined therein. The lower thrust dynamic pressure groove array 722 is arranged radially inward of a circle 732 which is centered on the central axis J1 and which touches a lower end opening of the communicating hole 61 at a radially outer point. Note that, in the case where the lower end opening is provided with a chamfer portion, the lower thrust dynamic pressure groove array 722 is arranged radially inward of a circle which is centered on the central axis J1 and which touches the chamfer portion at a radially outer point. An outer edge portion of the lower thrust dynamic pressure groove array 722 is arranged to overlap with the lower end opening of the communicating hole 61. In the lower thrust gap 652 illustrated in FIG. 4, a dynamic pressure bearing portion 822, which is a dynamic pressure generation portion arranged to generate a fluid dynamic pressure acting on the lubricating oil 45 in the thrust direction, is defined through the lower thrust dynamic pressure groove array 722. Hereinafter, the dynamic pressure bearing portion 822 will be referred to as a "lower thrust dynamic pressure bearing portion 822".

Note that it is sufficient that at least one of dynamic pressure grooves that define the lower thrust dynamic pressure groove array 722 is arranged radially inward of the circle 732. Also note that all of the dynamic pressure grooves that define the lower thrust dynamic pressure groove array 722 may be arranged radially inward of the circle 732. These arrangements fall within the scope of preferred embodiments of the present invention.

Even when the upper thrust dynamic pressure groove array 721 is arranged to overlap with the upper end opening of the communicating hole 61, and the lower thrust dynamic pressure groove array 722 is arranged to overlap with the lower end opening of the communicating hole 61, a difference in pressure between an interior and an exterior of the communicating hole 61 is eliminated through a region where the upper thrust dynamic pressure groove array 721 or the lower thrust dynamic pressure groove array 722 is not arranged. As a result, a reduction in a difference in pressure between the upper and lower seal portions 661a and 662a is achieved.

While the motor 12 is driven, the inner tubular portion 51 of the sleeve portion 5 is supported by the radial dynamic pressure bearing 81 in the radial direction with respect to the shaft portion 41, while the flange portion 52 is supported by a thrust dynamic pressure bearing defined by the upper thrust dynamic pressure bearing portion 821 and the lower thrust dynamic pressure bearing portion 822 in the thrust direction with respect to the upper thrust portion 42 and the outer tubular portion 432.

At this time, each of the upper and lower radial dynamic pressure groove arrays 711 and 712 illustrated in FIG. 5 generates a sufficient dynamic pressure by pumping the lubricating oil 45 to a middle portion thereof. As described above, the groove lower portion 711b of the upper radial dynamic pressure groove array 711 preferably is shorter than the groove upper portion 711a thereof, while the groove upper portion 712a of the lower radial dynamic pressure groove array 712 preferably is shorter than the groove lower portion 712b thereof. The radial dynamic pressure bearing 81 as a whole is arranged to generate very little pressure acting on the lubricating oil 45 in the vertical direction.

Meanwhile, in the upper thrust gap 651 illustrated in FIG. 4, a pressure acting on the lubricating oil 45 in the direction of the shaft portion 41 is generated by the upper thrust dynamic pressure bearing portion 821. The pressure on the lubricating oil 45 is thereby increased in a top portion of the radial gap 62 and a radially inner portion of the upper thrust gap 651, whereby generation of an air bubble is prevented therein.

In the lower thrust dynamic pressure bearing portion 822, a pressure acting on the lubricating oil 45 in the direction of the cylindrical gap 64 is generated. The pressure on the lubricating oil 45 is increased in a bottom portion of the radial gap 62, the lower end gap 63, the cylindrical gap 64, and a radially inner portion of the lower thrust gap 652, whereby the generation of an air bubble is prevented in the cylindrical gap 64 and the lower end gap 63. As described above, in the motor 12, a pressure is applied to the lubricating oil 45 throughout the entire channel 6 for the lubricating oil 45 except in the upper and lower seal gaps 611 and 662 and the communicating hole 61, so that a sufficient bearing performance of the bearing mechanism 4 is ensured.

Figure 8:
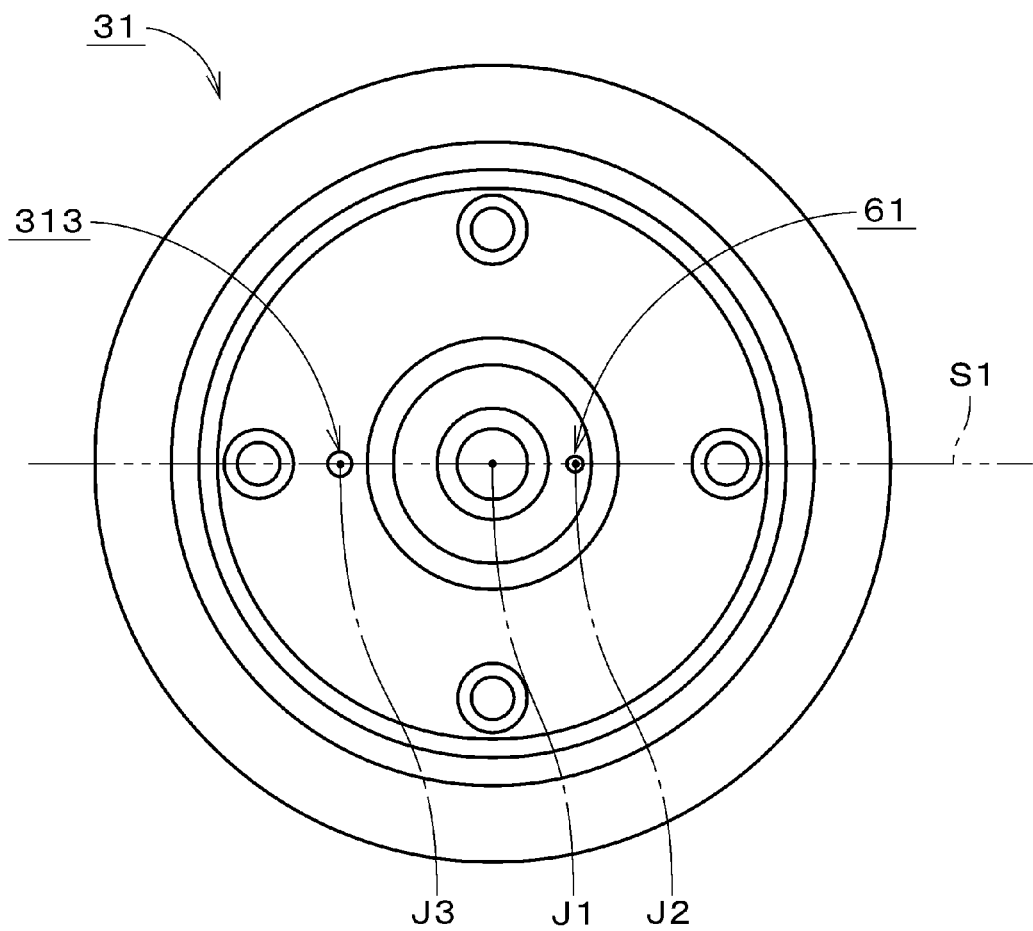
FIG. 8 is a bottom view of a rotor hub according to the first preferred embodiment of the present invention.
Figure 9:
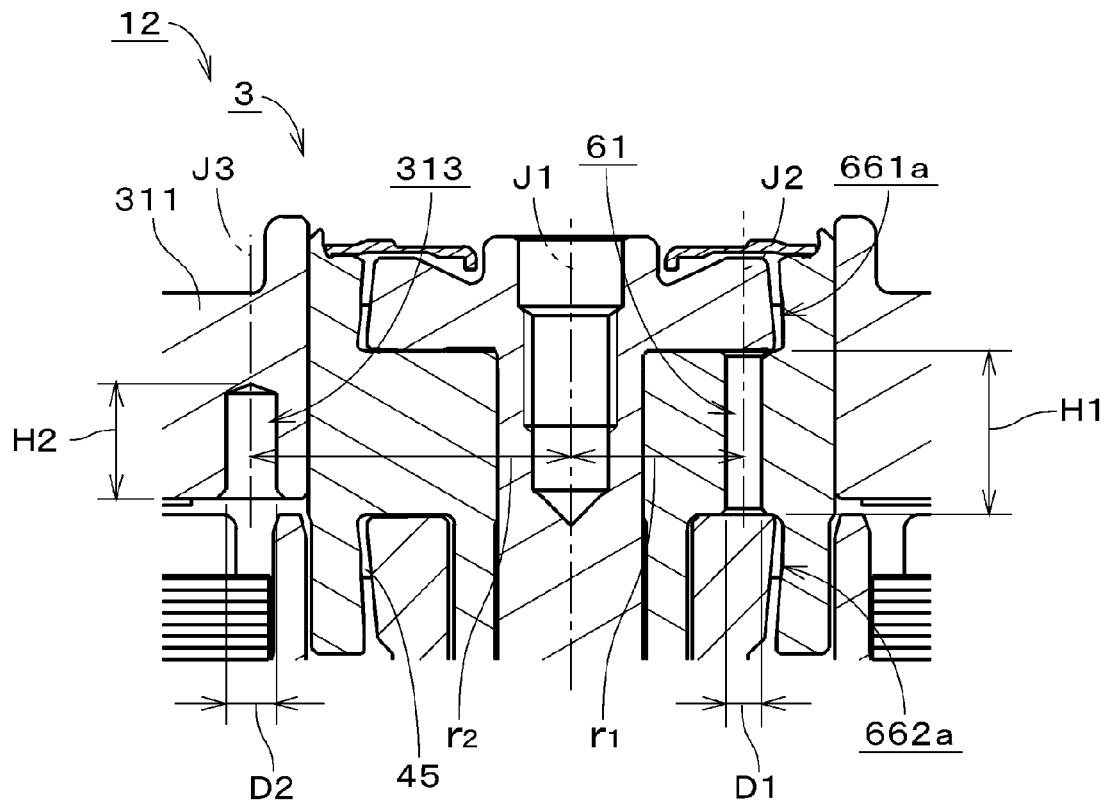
FIG. 9 is a cross-sectional view of the motor according to the first preferred embodiment of the present invention.

FIG. 8 is a bottom view of the rotor hub 31. A central axis of the communicating hole 61, which is substantially parallel to the central axis J1, will be hereinafter referred to as a "central axis J2". A central axis of the adjusting hole portion 313, which is parallel or substantially parallel to the central axis J1, will be hereinafter referred to as a "central axis J3". The communicating hole 61 is arranged substantially on the same straight line with the adjusting hole portion 313 with the central axis J1 arranged therebetween substantially on the same straight line. That is, a center of the adjusting hole portion 313 is located on a surface S1 that includes the central axis J1 and the central axis J2 of the communicating hole 61, and is located on an opposite side of the central axis J1 with respect to the communicating hole 61. More preferably, the center of the adjusting hole portion 313 is arranged substantially on the same plane that includes the central axis J1 and the central axis J2 of the communicating hole 61. Referring to FIG. 9, the adjusting hole portion 313 is arranged radially outward of both the upper and lower seal portions 661a and 662a. The axial extension range H1 of the communicating hole 61 is arranged to overlap with the axial extension range H2 of the adjusting hole portion 313. More preferably, the axial extension range H1 of the communicating hole 61 is arranged to overlap the entire axial extension range H2 of the adjusting hole portion 313 in the radial direction. In short, an upper end of the communicating hole 61 is arranged at a level higher than that of a lower end of the adjusting hole portion 313, while a lower end of the communicating hole 61 is arranged at a level lower than that of an upper end of the adjusting hole portion 313. The diameter D2 of the adjusting hole portion 313 is arranged to be greater or substantially greater than the diameter D1 of the communicating hole 61.

Providing the adjusting hole portion 313 in the motor 12 causes the center of gravity of the rotating portion 3 to be closer to the central axis J1 than in the case where the adjusting hole portion 313 is not provided. The degree of displacement of the center of gravity of the rotating portion 3 from the central axis J1 may be determined by a making a calculation, but may alternatively be evaluated by any of a variety of other methods. For example, horizontal vibrations that occur in the cover portion 311 when the rotating portion 3 is caused to rotate at a constant angular speed may be measured to determine the degree of displacement. Alternatively, a force of a sway that occurs in a shaft attached to the rotating portion 3 may be measured to determine the degree of displacement.

A centrifugal force that occurs in the center of gravity of the rotating portion 3, that is, a force of a sway of the rotating portion 3, is given by $MR\omega^2$, where M denotes the mass of the rotating portion 3, R denotes the distance between the center of gravity of the rotating portion 3 and the central axis J1, and $\omega$ denotes the angular speed of the rotating portion 3. Accordingly, the product MR of the mass M of the rotating portion 3 and the distance R between the central axis J1 and the center of gravity of the rotating portion 3 is arranged to satisfy this inequality: $MR<M'R'$, where M' denotes the mass of an equivalent rotating portion without the adjusting hole portion, and R' denotes the distance between the central axis J1 and the center of gravity of this rotating portion. A reduction in the degree of unbalance of the rotating portion 3 is thereby achieved. In designing the motor 12, the position and size of the adjusting hole portion 313 may be simply determined so that this inequality, $R<R'$, holds, considering that the mass M of the rotating portion 3 remains equal or substantially equal regardless of whether the adjusting hole portion 313 is provided. The same holds true for other preferred embodiments of the present invention described below.

Alternatively, the position and size of the adjusting hole portion 313 may be determined so that $\sigma_1 V_1 r_1 = \sigma_2 V_2 r_2$, where $V_1$ denotes the volume of the communicating hole 61, $V_2$ denotes the volume of the adjusting hole portion 313, $\sigma_1$ denotes the density of the sleeve portion 5, $\sigma_2$ denotes the density of the cover portion 311, $r_1$ denotes the distance between the central axis J1 and the central axis J2 of the communicating hole 61, and $r_2$ denotes the distance between the central axis J1 and the central axis J3 of the adjusting hole portion 313.

Note that the above equation may not necessarily be strictly satisfied. For example, in the case where the product $\sigma_1 r_1$ of the density $\sigma_1$ of the sleeve portion 5 and the distance $r_1$ between the central axis J1 and the central axis J2 of the communicating hole 61 is greater than the product $\sigma_2 r_2$ of the density $\sigma_2$ of the cover portion 311 and the distance $r_2$ between the central axis J1 and the central axis J3 of the adjusting hole portion 313, the volume $V_2$ of the adjusting hole portion 313 is designed to be greater than the volume $V_1$ of the communicating hole 61. In the case where the product $\sigma_1 r_1$ of the density $\sigma_1$ and the distance $r_1$ is smaller than the product $\sigma_2 r_2$ of the density $\sigma_2$ and the distance $r_2$, the volume $V_2$ of the adjusting hole portion 313 is designed to be smaller than the volume $V_1$ of the communicating hole 61. In the case where the product $\sigma_1 r_1$ is equal to the product $\sigma_2 r_2$, the volume $V_2$ is designed to be substantially equal to the volume $V_1$.

Note that, considering that this inequality, $r_1 < r_2$, usually holds, the position and size of the adjusting hole portion 313 may be determined so that this inequality, $V_2 < (\sigma_1/\sigma_2) \cdot V_1$, holds.

To be completely accurate, it is necessary to take into consideration the weight of a portion of the lubricating oil 45 which is arranged in the communicating hole 61 when the position and size of the adjusting hole portion 313 is determined. However, the specific gravity of the lubricating oil 45 is so much smaller than that of the components of the rotating portion 3, such as, for example, the sleeve portion and the cover portion 311, such that the weight of the lubricating oil 45 can be considered to be negligible as compared to the weight of the rotating portion 3. Therefore, it is not necessary to take into consideration the presence of the lubricating oil 45 in the design of the rotating portion 3. The same holds true for other preferred embodiments of the present invention described below.

The motor 12 according to the first preferred embodiment has been described above. Providing the adjusting hole portion 313 in the motor 12 contributes to a reduction in the degree of unbalance of the rotating portion 3 due to the communicating hole 61. This contributes to reducing vibrations of the motor 12. A sufficient volume of the adjusting hole portion 313 can be easily secured by arranging the diameter of the adjusting hole portion 313 to be greater than the diameter of the communicating hole 61 in the motor 12. Accordingly, balance adjustment of the rotating portion can be easily accomplished even in the case where the density of the cover portion 311 is smaller than the density of the sleeve portion 5. The above-described technique of defining the adjusting hole portion 313 is particularly suitable for motors in which only one communicating hole 61 is provided.

The motor 12 having only one communicating hole 61 provided therein contributes to a reduction in the amount of the lubricating oil 45 fed into the bearing mechanism 4, which in turn contributes to easily preventing the lubricating oil 45 from leaking out of the motor 12 even when an increase in temperature inside the motor 12 causes an expansion of the lubricating oil 45. In addition, a reduction in a time required to feed the lubricating oil 45 into the bearing mechanism 4 is achieved.

It is easy to provide the adjusting hole portion 313 because the cover portion 311, in which the adjusting hole portion 313 is defined, has a relatively large thickness. Furthermore, the adjusting hole portion 313 including an opening only in the lower surface 311a of the cover portion 311 contributes to avoiding an interference with another member as compared to the case where the adjusting hole portion 313 is defined in the upper surface 311b or an outer circumferential surface of the cover portion 311, which is arranged to be in contact with another member. More preferably, the adjusting hole portion 313 is defined over the stator 22 with a sufficient space defined therebetween.

Because the cover portion 311 is preferably made of, for example, aluminum, it is easy to process the cover portion 311. A two-step drill including an angled surface arranged to define a chamfer portion in the adjusting hole portion 313 may be used to define the chamfer portion at an end opening of the adjusting hole portion 313 at the same time when the adjusting hole portion 313 is defined. This contributes to reducing the number of processing steps, and to defining the adjusting hole portion 313 at a lower cost.

Because the adjusting hole portion 313 is entirely exposed from the sheet member 33 in the motor 12, it is easy to identify the position of the communicating hole 61 in the bearing mechanism 4 based on the position of the adjusting hole portion 313. Note, however, that only a portion of the adjusting hole portion 313 may be exposed from the sheet member 33. It is sufficient that at least a portion of the adjusting hole portion 313 is exposed from the sheet member 33. The same holds true for other preferred embodiments of the present invention described below.

The axial distance between the surface of the lubricating oil 45 in the upper seal portion 661a and the surface of the lubricating oil 45 in the lower seal portion 662a is shorter than the axial length of the radial dynamic pressure bearing 81. The axial length of the radial dynamic pressure bearing 81 refers to the distance between an upper end and a lower end of the radial dynamic pressure bearing 81. More specifically, the axial length of the radial dynamic pressure bearing 81 refers to the distance between an upper end of the groove upper portion 711a of the upper radial dynamic pressure groove array 711 and a lower end of the groove lower portion 712b of the lower radial dynamic pressure groove array 712. Note that a portion that does not contribute to the function of the dynamic pressure bearing may exist between the upper and lower ends. The same holds true for other preferred embodiments of the present invention described below. A reduction in the difference in pressure between the upper and lower seal portions 661a and 662a is achieved by arranging the upper and lower seal portions 661a and 662a to be closer to each other in the axial direction as described above. This facilitates a design to prevent or substantially prevent any leakage of the lubricating oil 45.

Moreover, the axial length of the communicating hole 61 is shorter than the axial distance between the upper and lower seal portions 661a and 662a. This contributes to reducing the amount of the lubricating oil 45 arranged in the communicating hole 61, and at the same time to reducing channel resistance. A reduction in a difference in pressure between the upper seal gap 661 and the lower seal gap 662 owing to influence of the channel resistance and gravity acting on the lubricating oil 45 in the communicating hole 61 is achieved. This contributes to reducing movement of the lubricating oil 45 between the upper and lower seal gaps 661 and 662, and to more easily preventing leakage of the lubricating oil 45.

Furthermore, the cylindrical gap 64, which corresponds to the second gap, is arranged to be in communication with a lower portion of the radial gap 62, which corresponds to the first gap, while at the same time the lower thrust gap 652, which corresponds to the third gap, is arranged axially above the lower radial dynamic pressure bearing portion 812. This arrangement makes it possible to arrange the lower thrust gap 652 to be closer to the upper thrust gap 651, thereby easily reducing the length of the communicating hole 61, which is arranged to make the upper thrust gap 651 and the lower thrust gap 652 in communication with each other. As a result, the upper seal portion 661a and the lower seal portion 662a are arranged to be closer to each other.

The communicating hole 61 is arranged to extend in parallel or substantially in parallel with the central axis J1 to reduce a difference between the distance from the upper end opening of the communicating hole 61 to the upper seal gap 661 and the distance from the lower end opening of the communicating hole 61 to the lower seal gap 662. This arrangement contributes to further reducing the difference in pressure between the upper seal gap 661 and the lower seal gap 662.

Furthermore, each of the upper seal gap 661 and the lower seal gap 662 includes an end opening that is angled in such a direction so as to face the central axis J1. Therefore, during rotation of the motor 12, the lubricating oil 45 is pressed inward in each of the upper and lower seal gaps 661 and 662 through a centrifugal force. This contributes to more securely preventing leakage of the lubricating oil 45. As a result, the design of the motor 12 is made easier.

The upper thrust dynamic pressure groove array 721 is preferably arranged to extend radially outward to such an extent that the outer edge portion of the upper thrust dynamic pressure groove array 721 overlaps with the communicating hole 61. As a result, a thrust dynamic pressure is efficiently obtained, and a portion of the flange portion 52 which is in the vicinity of an outer edge thereof is supported by the upper thrust dynamic pressure bearing portion 821. This contributes to more stable support of the sleeve portion 5. The same holds true for the lower thrust dynamic pressure groove array 722.

In the motor 12, the lower thrust gap 652 is arranged in the upper portion of the bearing mechanism 4. Accordingly, a space is secured below the lower thrust gap 652, and the fixing region 436 where the outer tubular portion 432 and the base plate 21 are fixed to each other can be arranged in this space. This enables the fixing region 436 to have a sufficient axial dimension. In the motor 12, a greater axial length of the radial gap 62 is preferred because an increase in the axial length of the radial dynamic pressure bearing 81 can thereby be achieved, and an increase in rigidity of the bearing mechanism 4 against an external force acting in such a direction as to tilt the rotating portion 3 can also be achieved. The fixing region 436 is arranged to overlap with at least a portion of the lower radial dynamic pressure bearing portion 812 in the radial direction. As a result, both an increase in the axial length of the radial gap 62 and an increase in the axial dimension of the fixing region 436 are achieved. Moreover, a periphery of a lower portion of the radial dynamic pressure bearing 81 is surrounded by the base plate 21. This results in increased rigidity of the surroundings of the lower portion of the radial dynamic pressure bearing 81. Moreover, a reduction in the thickness of the motor 12 as a whole in a direction parallel or substantially parallel to the central axis J1 is achieved.

Because the shaft portion 41 and the upper thrust portion 42 are defined by a single continuous monolithic member, and the lower plate portion 431 and the outer tubular portion 432 are defined by a single continuous monolithic member, a reduction in the number of components of the motor 12 is achieved. It is easy to define the communicating hole 61 in the sleeve portion 5 because the communicating hole 61 is arranged to have a small axial length and to extend in parallel or substantially in parallel with the central axis J1. A reduction in the total amount of the lubricating oil is also achieved.

Note that the diameter of the communicating hole 61 may be reduced to as small or about as small as the width of the cylindrical gap 64 in order to achieve an additional reduction in the amount of the lubricating oil 45.

Figure 10:
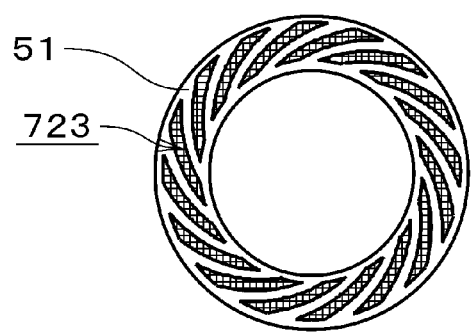
FIG. 10 is a diagram illustrating an inner tubular portion according to a modification of the first preferred embodiment of the present invention.

FIG. 10 is a bottom view of the inner tubular portion 51 according to a modification of the first preferred embodiment. Referring to FIG. 10, in the motor 12, a lower surface of the inner tubular portion 51 may include a thrust dynamic pressure groove array 723 defined therein. As a result, a thrust dynamic pressure bearing portion arranged to support the inner tubular portion 51 in the thrust direction is defined in the lower end gap 63 illustrated in FIG. 3. In this case, a dynamic pressure generation portion that functions as a thrust dynamic pressure bearing portion may not necessarily be arranged in the lower thrust gap 652. Note, however, that it is preferable that a dynamic pressure groove array which defines a dynamic pressure generation portion arranged to induce a pressure acting radially inward on the lubricating oil 45 should be arranged in the lower thrust gap. In the case of the structure illustrated in FIG. 10, the axial width of the lower thrust gap is preferably arranged to be greater than that of the lower end gap. The same holds true for a second preferred embodiment of the present invention described below.

Figure 11:
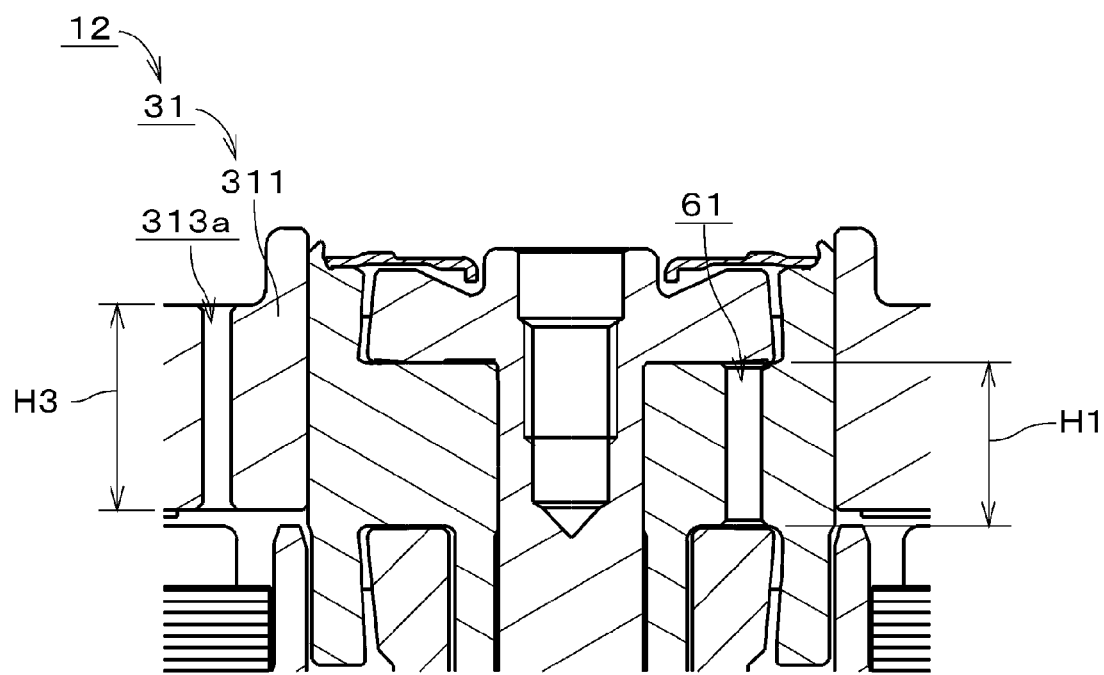
FIG. 11 is a diagram illustrating an adjusting hole portion according to a modification of the first preferred embodiment of the present invention.

FIG. 11 is a diagram illustrating an adjusting hole portion according to a modification of the first preferred embodiment. The cover portion 311 of the rotor hub 31 includes an adjusting hole portion 313a arranged to extend completely through the cover portion 311 in the vertical direction. The axial length of the adjusting hole portion 313a is arranged to be greater than the axial length of the communicating hole 61. A portion of the axial extension range H3 of the adjusting hole portion 313a is arranged to overlap with the axial extension range H1 of the communicating hole 61 in the radial direction. Because the adjusting hole portion 313a of the motor 12 is arranged to have a large axial length, it is possible to secure a sufficient volume of the adjusting hole portion 313a without a need to increase the diameter of the adjusting hole portion 313a. Moreover, because the adjusting hole portion 313a is arranged to extend completely through the cover portion 311 in the vertical direction, it is easy to define the adjusting hole portion 313a therein. It is also easy to remove dust from the adjusting hole portion 313a. The same holds true for other preferred embodiments of the present invention described below.

Figure 12:
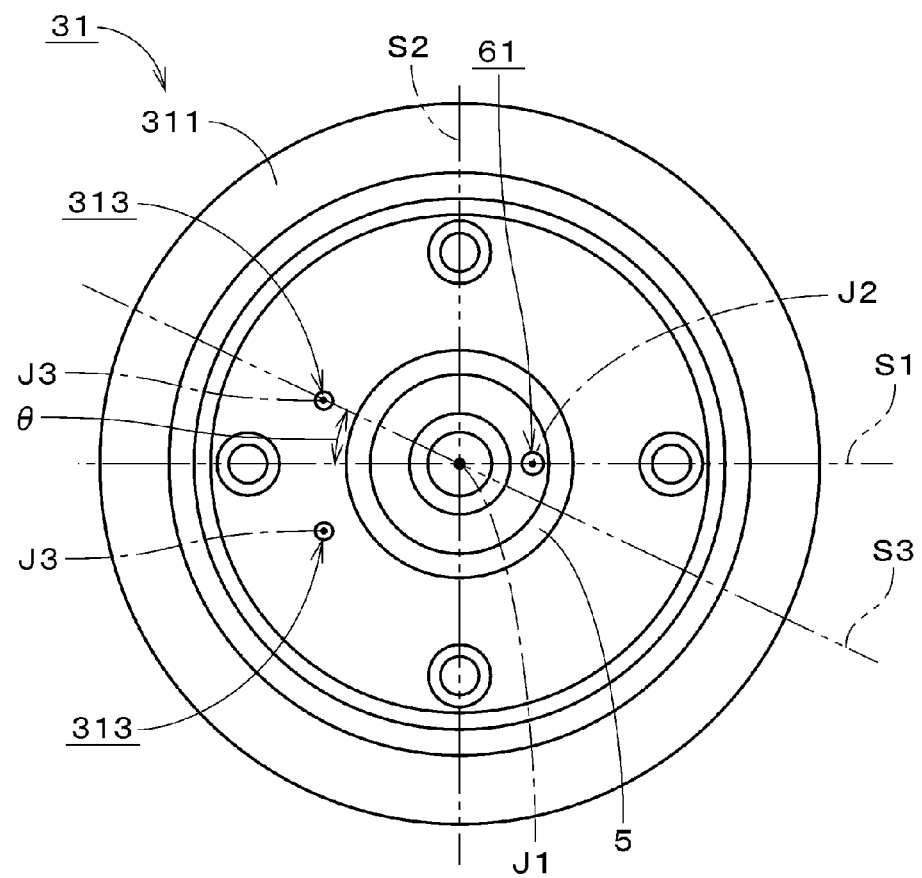
FIG. 12 is a bottom view of a rotor hub of a motor according to a second preferred embodiment of the present invention.

FIG. 12 is a bottom view of a rotor hub 31 of a motor according to the second preferred embodiment. The rotor hub 31 preferably includes two adjusting hole portions 313 having the same or substantially the same size. The motor according to the second preferred embodiment is otherwise similar in structure to the motor 12 according to the first preferred embodiment. Accordingly, like members or portions are designated by like reference numerals, and redundant description is omitted. The two adjusting hole portions 313 are arranged to be symmetrical with respect to a plane S1 which includes a central axis J1 and a central axis J2 of a communicating hole 61. In addition, the two adjusting hole portions 313 are arranged on an opposite side of the central axis J1 with respect to the communicating hole 61. To be more precise, a pair of the two adjusting hole portions 313 and the communicating hole 61 are arranged on opposite sides of a plane S2 which includes the central axis J1 and which is perpendicular or substantially perpendicular to the plane S1 which includes the central axis J1 and the central axis J2 of the communicating hole 61. In a manner similar to that illustrated in FIG. 9, the axial extension range of each of the two adjusting hole portions 313 is arranged to overlap with the axial extension range of the communicating hole 61. The same holds true for adjusting hole portions according to other preferred embodiments of the present invention described below.

In FIG. 12, a component of a vector from the central axis J1 to a central axis J3 of each adjusting hole portion 313 in a plan view, the component being parallel or substantially parallel to the plane S1, is given by $r_2 \cdot \cos \theta$, where $r_2$ denotes the distance from the central axis J1 to the central axis J3 of each adjusting hole portion 313, and $\theta$ denotes an angle defined between the plane S1, which includes the central axis J1 and the central axis J2 of the communicating hole 61, and a plane S3 which includes the central axis J1 and the central axis J3 of one of the adjusting hole portions 313. The position and size of each adjusting hole portion 313 is determined so that the product $\sigma_2 V_2 r_2 \cdot \cos \theta$ of this vector component $r_2 \cdot \cos \theta$, a total volume $V_2$ of the two adjusting hole portions 313, and the density $\sigma_2$ of the cover portion 311 becomes equal to the product $\sigma_1 V_1 r_1$ of the volume $V_1$ of the communicating hole 61, the density $\sigma_1$ of the sleeve portion 5, and the distance $r_1$ from the central axis J1 to the central axis J2 of the communicating hole 61. Note that, because this inequality, $r_1 < r_2$, usually holds, the position and size of each adjusting hole portion 313 may be determined so that this inequality, $V_2 \cdot \cos \theta < (\sigma_1/\sigma_2) \cdot V_1$, holds.

Also in the second preferred embodiment, providing the adjusting hole portions 313 contributes to reducing unbalance of a rotating portion 3. This in turn contributes to reducing vibrations of the motor. That is, presence of the adjusting hole portions 313 reduces the degree of displacement of the center of gravity of the rotating portion 3 from the central axis J1. Note that, in the case where it is desirable that the diameter of each adjusting hole portion 313 should be increased to make it easy to define the adjusting hole portions 313, the two adjusting hole portions 313 may be significantly spaced from each other in the circumferential direction. For example, the adjusting hole portions 313 and the communicating hole 61 may be arranged at intervals of 120 degrees or approximately 120 degrees in the circumferential direction.

In a modification of the above-described preferred embodiment, three or more adjusting hole portions 313 may be provided to reduce vibrations of the motor. A relationship between the adjusting hole portions 313 and the communicating hole 61 is expressed in general terms as follows:

$$\left| \sum_{i=1}^{k} \sigma_2 V_{2i} vr_{2i} + \sigma_1 V_1 vr_1 \right| < |\sigma_1 V_1 vr_1| \qquad \text{Inequality (1)}$$

where k (a natural number) denotes a total number of adjusting hole portions 313 defined in the rotor hub 31, $\sigma_1$ denotes the density of the sleeve portion 5, $V_1$ denotes the volume of the communicating hole 61, $vr_1$ denotes a vector from the central axis J1 to the central axis J2 of the communicating hole 61 in the plan view, $\sigma_2$ denotes the density of the cover portion 311, $V_{2i}$ denotes the volume of an ith adjusting hole portion 313, and $vr_{2i}$ denotes a vector from the central axis J1 to the central axis J3 of the ith adjusting hole portion 313 in the plan view. In design of the adjusting hole portions 313, the position and size of at least one of the adjusting hole portions 313 are determined so that Inequality (1) above holds.

Figure 13:
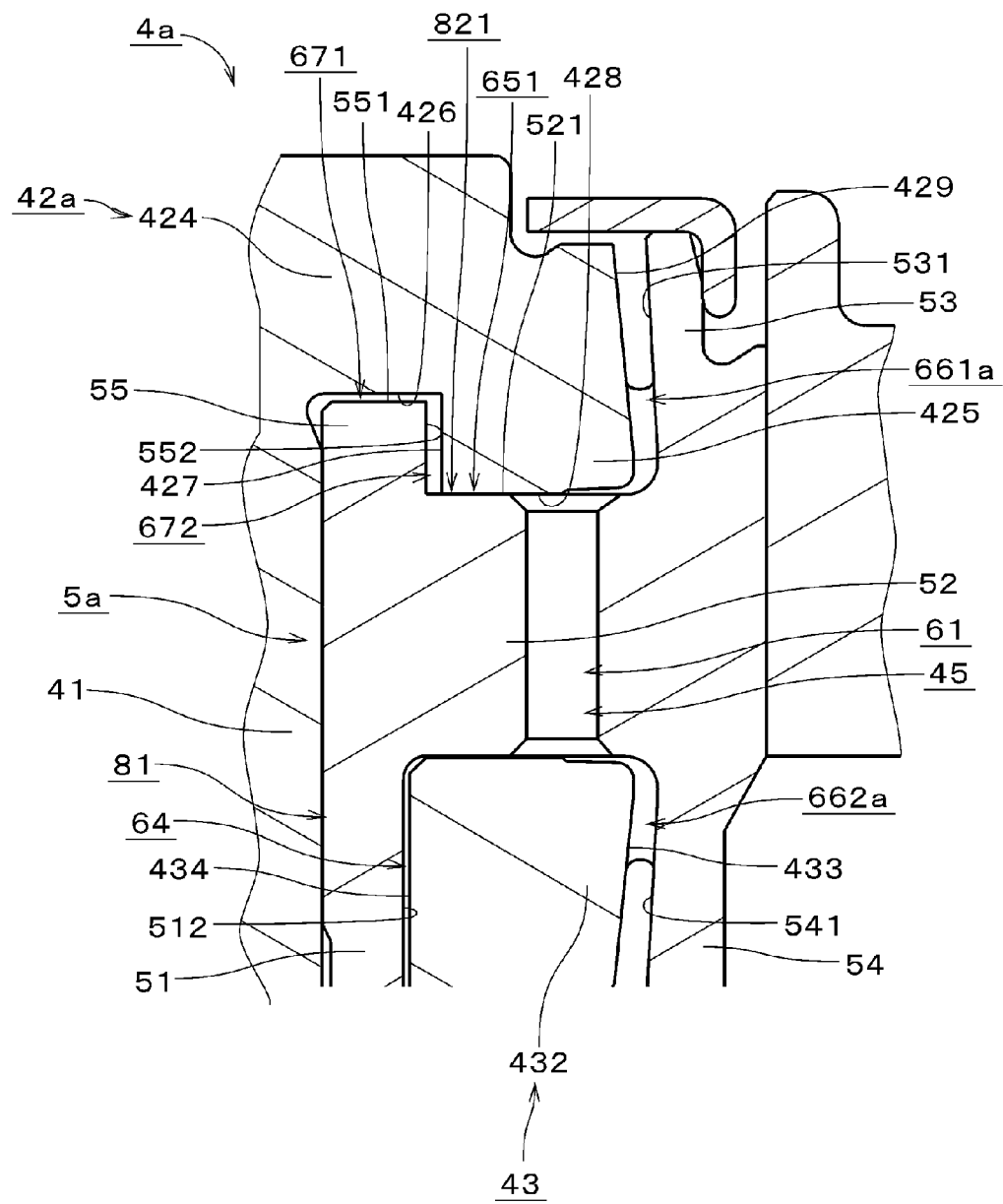
FIG. 13 is a cross-sectional view of a bearing mechanism of a motor according to a third preferred embodiment of the present invention.

FIG. 13 is a diagram illustrating a portion of a bearing mechanism 4a of a motor according to a third preferred embodiment of the present invention. A sleeve portion 5a of the bearing mechanism 4a includes an annular upper inner tubular portion 55 arranged to extend upward from an upper portion of an inner tubular portion 51. Hereinafter, the inner tubular portion 51, which is arranged on a lower side of a flange portion 52, will be referred to as a "lower inner tubular portion 51" when distinguished from the upper inner tubular portion 55. An upper thrust portion 42a preferably includes an upper plate portion 424 arranged to extend radially outward from an upper portion of a shaft portion 41, and an upper outer tubular portion 425 arranged to extend downward from an outer edge portion of the upper plate portion 424. An outer tubular portion 432 will be hereinafter referred to as a "lower outer tubular portion 432" when distinguished from the upper outer tubular portion 425. The bearing mechanism 4a is otherwise similar in structure to the bearing mechanism 4 of the motor 12 according to the first preferred embodiment. Accordingly, like members or portions are designated by like reference numerals, and redundant description is omitted.

As is the case with the motor 12 illustrated in FIG. 2, the motor according to the third preferred embodiment includes an adjusting hole portion 313 defined in a cover portion 311. The adjusting hole portion 313 is arranged on an opposite side of the central axis J1 with respect to a communicating hole 61. This arrangement contributes to reducing the degree of unbalance of a rotating portion 3. This in turn contributes to reducing vibrations of the motor.

Referring to FIG. 13, a gap 671 is defined between an upper surface 551 of the upper inner tubular portion 55 and a lower surface 426 of the upper plate portion 424 in the axial direction, i.e., in the vertical direction in FIG. 13. Hereinafter, the gap 671 will be referred to as an "upper end gap 671". In addition, a cylindrical gap 672 is defined between an outer circumferential surface 552 of the upper inner tubular portion 55 and an inner circumferential surface 427 of the upper outer tubular portion 425 in the radial direction. Hereinafter, the gap 672 will be referred to as an "upper cylindrical gap 672". Hereinafter, A cylindrical gap 64, which is defined between an outer circumferential surface 512 of the lower inner tubular portion 51 and an inner circumferential surface 434 of the lower outer tubular portion 432, will be referred to as a "lower cylindrical gap 64" when distinguished from the upper cylindrical gap 672.

An upper thrust dynamic pressure groove array 721 similar to that illustrated in FIG. 6 is defined in a lower surface 428 of the upper outer tubular portion 425 of the upper thrust portion 42a. As a result, an upper thrust dynamic pressure bearing portion 821 is defined in an upper thrust gap 651 defined between the lower surface 428 of the upper outer tubular portion 425 and an upper surface 521 of the flange portion 52. In the bearing mechanism 4a, the upper thrust dynamic pressure bearing portion 821 and a radial dynamic pressure bearing 81 are arranged to be in communication with each other through the upper cylindrical gap 672 and the upper end gap 671.

An upper seal portion 661a is defined between an outer circumferential surface 429 of the upper outer tubular portion 425 and an inner circumferential surface 531 of an upper hub tubular portion 53. A lower seal portion 662a is defined between an inclined surface 433 of the lower outer tubular portion 432 and an inner circumferential surface 541 of a lower hub tubular portion 54. The upper seal portion 661a and the lower seal portion 662a are arranged to be in communication with each other through the communicating hole 61. The axial distance between an upper end of a surface of a lubricating oil 45 in the upper seal portion 661a and a lower end of a surface of the lubricating oil 45 in the lower seal portion 662a is longer than the axial length of the communicating hole 61 and shorter than the axial length of the radial dynamic pressure bearing 81.

Also in the third preferred embodiment, the axial distance between the surface of the lubricating oil 45 in the upper seal portion 661a and the surface of the lubricating oil 45 in the lower seal portion 662a is shorter than the axial length of the radial dynamic pressure bearing 81. This arrangement contributes to reducing a difference in pressure between the upper seal portion 661a and the lower seal portion 662a. This contributes to easily preventing or substantially preventing leakage of the lubricating oil 45. Furthermore, the length of the communicating hole 61 being shorter than the distance between the upper seal portion 661a and the lower seal portion 662a makes it easier to prevent a leakage of the lubricating oil 45.

Providing the upper cylindrical gap 672 and the lower cylindrical gap 64 contributes to reducing the length of the communicating hole 61. The reduced length of the communicating hole 61 contributes to arranging the upper and lower seal portion 661a and the lower seal portion 662a to be closer to each other, whereby leakage of the lubricating oil 45 is prevented more easily. Moreover, the upper end gap 671 and the upper cylindrical gap 672 are arranged between the upper thrust dynamic pressure bearing portion 821 and the radial dynamic pressure bearing 81. This arrangement contributes to increased pressure on the lubricating oil 45 in the upper end gap 671 and the upper cylindrical gap 672, whereby the generation of an air bubble is prevented therein.

In the bearing mechanism 4a, the upper surface 551 of the upper inner tubular portion 55 may include a thrust dynamic pressure groove array similar to the thrust dynamic pressure groove array 723 illustrated in FIG. 10 defined therein. This results in a thrust dynamic pressure bearing portion being defined in the upper end gap 671 to support the upper inner tubular portion 55 in the thrust direction. In this case, a dynamic pressure generation portion that functions as an upper thrust dynamic pressure bearing portion may not necessarily be arranged in the upper thrust gap 651. Note, however, that it is preferable that a dynamic pressure groove array which defines a dynamic pressure generation portion arranged to induce a radially inward pressure acting on the lubricating oil 45 should be arranged in the upper thrust gap 651. The axial width of the upper end gap 671 is preferably arranged to be greater than that of the upper thrust gap 651.

Figure 14:
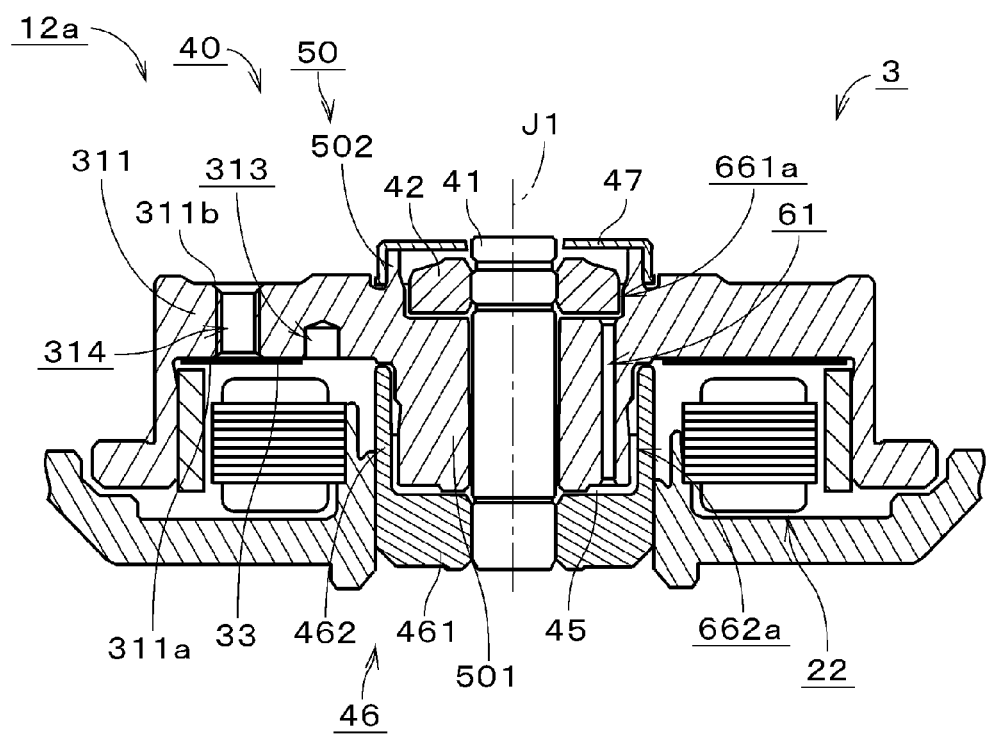
FIG. 14 is a cross-sectional view of a motor according to a fourth preferred embodiment of the present invention.

FIG. 14 is a vertical cross-sectional view of a motor 12a according to a fourth preferred embodiment of the present invention. The motor 12a includes a bearing mechanism 40 having a structure different from that of the bearing mechanism 4 of the motor 12 according to the first preferred embodiment. The bearing mechanism 40 preferably includes a shaft portion 41, an upper thrust portion 42, a lower thrust portion 46, a sleeve portion 50, a seal cap 47, and a lubricating oil 45. The upper thrust portion 42 is preferably arranged in the shape of a flat plate, and arranged to extend radially outward from an upper portion of the shaft portion 41. The shaft portion 41 and the upper thrust portion 42 are preferably defined by separate members.

The lower thrust portion 46 preferably includes a lower plate portion 461 and an outer tubular portion 462. The lower plate portion 461 is arranged to extend radially outward from a lower portion of the shaft portion 41. The outer tubular portion 462 is arranged to extend axially upward from an outer edge portion of the lower plate portion 461. The sleeve portion 50 includes a substantially cylindrical sleeve body 501 and an upper hub tubular portion 502. The shaft portion 41 is inserted in the sleeve body 501. The sleeve body 501 includes a communicating hole 61 arranged to extend through the sleeve body 501 in the vertical direction. The number of communicating holes 61 is preferably one, for example. A cover portion 311 is arranged to extend radially outward from an upper portion of the sleeve body 501. The sleeve portion 50 and the cover portion 311 preferably are defined by a single continuous monolithic member.

The cover portion 311 includes a non-through (i.e. a blind hole) adjusting hole portion 313 and a screw hole 314. The adjusting hole portion 313 is arranged above a stator 22 to extend from a lower surface 311a of the cover portion 311 up to a vicinity of an upper surface 311b of the cover portion 311. The number of adjusting hole portions 313 is one. The adjusting hole portion 313 is arranged to be closer to a central axis J1 than is the screw hole 314. A sheet member 33 is attached to the lower surface 311a of the cover portion 311 to close a lower opening of the screw hole 314. Note, however, that the adjusting hole portion 313 is exposed from the sheet member 33.

The upper hub tubular portion 502 is arranged to extend upward from an outer edge portion of the sleeve body 501. The seal cap 47 is fixed to an upper end portion of the upper hub tubular portion 502 preferably through, for example, press fitting and/or adhesion. The seal cap 44 is arranged to extend radially inward from the upper hub tubular portion 502. The motor 12a is otherwise similar in structure to the motor 12 according to the first preferred embodiment. Accordingly, like members or portions are designated by like reference numerals, and redundant description is omitted.

Figure 15:
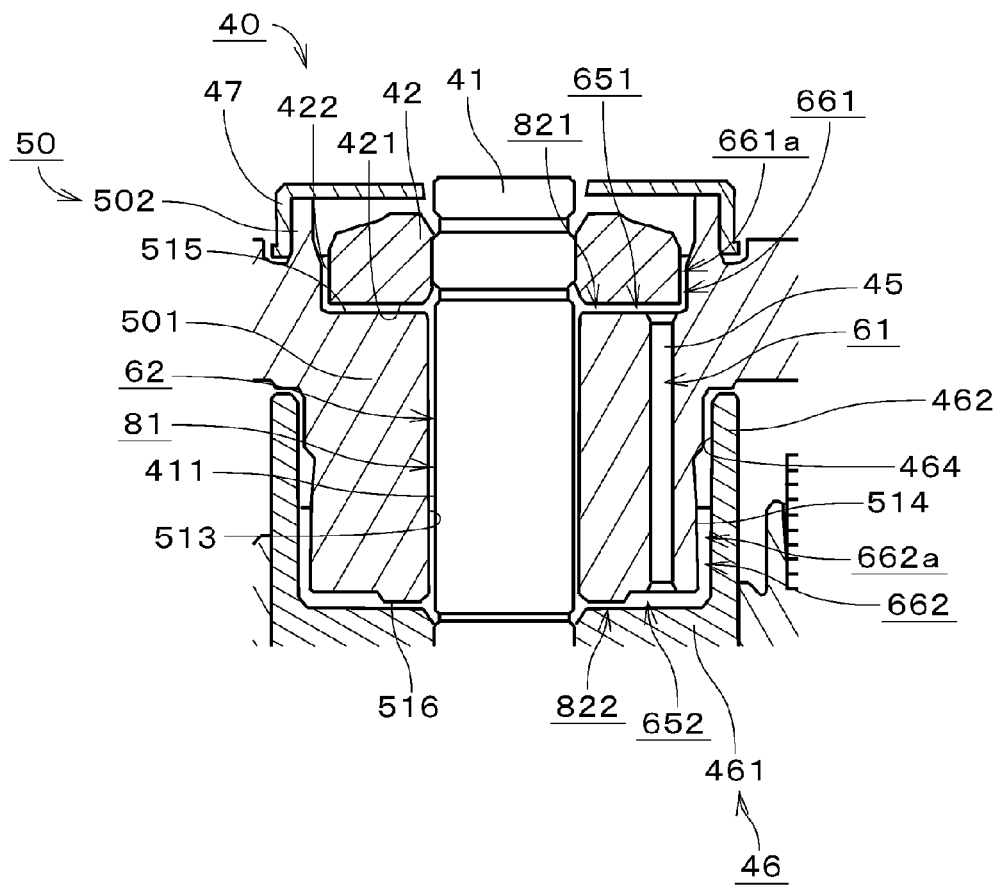
FIG. 15 is a cross-sectional view of a bearing mechanism according to the fourth preferred embodiment of the present invention.

Referring to FIG. 15, in the bearing mechanism 40, a radial gap 62, which corresponds to the first gap, is defined between an outer circumferential surface 411 of the shaft portion 41 and an inner circumferential surface 513 of the sleeve body 501. A cylindrical lower seal gap 662, which corresponds to the second gap, is defined between an outer circumferential surface 514 of the sleeve body 501 and an inner circumferential surface 464 of the outer tubular portion 462.

An upper thrust gap 651 is defined between an upper surface 515 of the sleeve body 501 and a lower surface 421 of the upper thrust portion 42. A lower thrust gap 652 is defined between a lower surface 516 of the sleeve body 501 and an upper surface of the lower plate portion 461. The upper thrust gap 651 and the lower thrust gap 652 are arranged to be in communication with each other through the communicating hole 61. An upper seal gap 661 is defined between an inner circumferential surface of the upper hub tubular portion 502 and an outer circumferential surface 422 of the upper thrust portion 42.

In the bearing mechanism 40, a channel including the upper seal gap 661, the upper thrust gap 651, the radial gap 62, the lower thrust gap 652, the lower seal gap 662, and the communicating hole 61 is continuously filled with the lubricating oil 45.

An upper seal portion 661a is defined in the upper seal gap 661 to retain the lubricating oil 45 therein. An upper surface of the lubricating oil 45 is arranged in the upper seal gap 661. An upper end opening of the upper seal gap 661 is covered with the seal cap 47. A lower seal portion 662a is defined in the lower seal gap 662 to retain the lubricating oil 45 therein. A lower surface of the lubricating oil 45 is arranged in the lower seal gap 662.

A radial dynamic pressure bearing 81 is defined in the radial gap 62 to generate a fluid dynamic pressure acting on the lubricating oil 45 in the radial direction. An upper thrust dynamic pressure bearing portion 821 and a lower thrust dynamic pressure bearing portion 822 are defined in the upper thrust gap 651 and the lower thrust gap 652, respectively, to generate fluid dynamic pressures acting on the lubricating oil 45 in the axial direction.

In the motor 12a, the sleeve portion 50 and the seal cap 47 are supported through the radial dynamic pressure bearing 81 and the upper thrust dynamic pressure bearing portion 821 and the lower thrust dynamic pressure bearing portion 822 to be rotatable with respect to the shaft portion 41, the upper thrust portion 42, and the lower thrust portion 46.

Referring to FIG. 14, as in the first preferred embodiment, the communicating hole 61 is arranged on or substantially on the same straight line with the adjusting hole portion 313 of the cover portion 311 with the central axis J1 arranged therebetween substantially on the same straight line. The adjusting hole portion 313 is arranged radially outward of both the upper seal portion 661a and the lower seal portion 662a. The axial extension range of the communicating hole 61 is arranged to overlap with the axial extension range of the adjusting hole portion 313.

As in the first preferred embodiment, in design of the motor 12a, the adjusting hole portion 313 is defined so that the following inequality is satisfied: $V_2 < (\sigma_1/\sigma_2) \cdot V_1$, where $V_1$ denotes the volume of the communicating hole 61, $V_2$ denotes the volume of the adjusting hole portion 313, $\sigma_1$ denotes the density of the sleeve portion 50, and $\sigma_2$ denotes the density of the cover portion 311. Notice here that the density $\sigma_1$ of the sleeve portion 50 and the density $\sigma_2$ of the cover portion 311 are equal to each other because the sleeve portion 50 and the cover portion 311 are defined preferably by a single continuous monolithic member in the present preferred embodiment. Therefore, the adjusting hole portion 313 may be defined so that this inequality, $V_2 < V_1$, holds. The center of gravity of a rotating portion 3 is thereby arranged to be closer to the central axis J1 than in the case where no adjusting hole portion 313 is provided.

Also in the motor 12a according to the fourth preferred embodiment, providing the adjusting hole portion 313 contributes to reducing the degree of unbalance of the rotating portion 3 due to the communicating hole 61. This in turn contributes to reducing vibrations of the motor 12a. In the motor 12a, the sleeve portion 50 and the cover portion 311 may alternatively be defined by separate members if so desired. In the case where the cover portion 311 is made of a material whose density is lower than that of the sleeve portion 50, a sufficient volume of the adjusting hole portion 313 can be easily secured by arranging the diameter of the adjusting hole portion 313 to be greater or substantially greater than the diameter of the communicating hole 61.

As in the second preferred embodiment, the number of adjusting hole portions 313 provided in the motor 12a may preferably be two. In this case, as described above with reference to FIG. 12, the adjusting hole portions 313 are defined so that the following inequality is satisfied: $V_2 \cdot \cos\theta < (\sigma_1/\sigma_2) \cdot V_1$, where $\theta$ denotes an angle defined between a plane S1 which includes the central axis J1 and a central axis J2 of the communicating hole 61, and a plane S3 which includes the central axis J1 and a central axis J3, $V_2$ denotes a total volume of the two adjusting hole portions 313, $\sigma_2$ denotes the density of the cover portion 311, $V_1$ denotes the volume of the communicating hole 61, and $\sigma_1$ denotes the density of the sleeve portion 50. Note, however, that the adjusting hole portions 313 may be defined so that this inequality, $V_2 \cdot \cos\theta < V_1$, holds because the density $\sigma_1$ of the sleeve portion 50 and the density $\sigma_2$ of the cover portion 311 are equal to each other as described above.

Note that three or more adjusting hole portions 313 may be provided in the motor 12a such that Inequality (1) mentioned above holds. Also in this case, a reduction in vibrations of the motor 12a is achieved.

Only selected preferred embodiments have been chosen to illustrate the present invention. To those skilled in the art, however, it will be apparent from the foregoing disclosure that various changes and modifications can be made herein without departing from the scope of the present invention as defined in the appended claims. Furthermore, the foregoing description of the preferred embodiments according to the present invention is provided for illustration only, and does not limit the present invention as defined by the appended claims and their equivalents.

For example, in a modification of each of the first, second, and third preferred embodiments, the sleeve portion 5 and the cover portion 311 may be defined by a single continuous monolithic member. In this case, it is preferable that the sleeve portion 5 and the cover portion 311 should be made of a ferritic stainless steel, such as SUS430, or aluminum, for example. In the case where the sleeve portion and the cover portion 311 are made of, for example, aluminum, a surface of the sleeve portion 5 may preferably be plated with nickel or the like. The sleeve portion 5 may preferably be made of, for example, brass or a sintered metal.

Each of the lower thrust portions 43 and 46 may be defined integrally with the base plate 21 as a single monolithic member. This contributes to reducing the number of components of the motor. Also, in a modification of each of the first, second, and third preferred embodiments, the shaft portion 41 and the upper thrust portion 42 may be defined by separate members. Also, in a modification of each of the above-described preferred embodiments, the lower plate portion 431 or 461 and the outer tubular portion 432 or 462 may be defined by separate members. Also, the lower thrust portion 43 may be defined integrally with the shaft portion 41 as a single monolithic member.

In the case where only one adjusting hole portion 313 is provided, the adjusting hole portion 313, the central axis J1, and the communicating hole 61 may not necessarily be arranged substantially on the same plane, as long as a reduction in the degree of unbalance of the rotating portion is achieved. Similarly, in the case where a plurality of adjusting hole portions 313 are provided, the adjusting hole portions 313 may not necessarily be arranged to be symmetrical with respect to a plane which includes the central axis J1 and the communicating hole 61.

In the groove upper portion of the upper radial dynamic pressure groove array 711 illustrated in FIG. 5, a plurality of oblique grooves may be arranged to extend obliquely along the grooves defining the upper radial dynamic pressure groove array 711. Also, each of the grooves defining the upper radial dynamic pressure groove array 711 may be arranged to have a greater depth in the groove upper portion than in the groove lower portion. This leads to an increased downward pressure acting on the lubricating oil 45. The same holds true for the groove lower portion of the lower radial dynamic pressure groove array 712. Also, the upper portion and the lower portion of each of the grooves that define the upper radial dynamic pressure groove array 711 may be arranged to have substantially the same length. Also, the upper portion and the lower portion of each of the grooves that define the lower radial dynamic pressure groove array 712 may be arranged to have substantially the same length. A variety of modifications can be made to the length, depth, width, and so on of each of the dynamic pressure grooves without departing from the scope and spirit of the present invention.

Each of the upper thrust dynamic pressure groove array 721 and the lower thrust dynamic pressure groove array 722 may alternatively be arranged in, for example, a herringbone pattern. In this case, a radially outer portion of the upper thrust dynamic pressure groove array 721 is arranged to have a length greater than a length of a radially inner portion thereof, and a radially outer portion of the lower thrust dynamic pressure groove array 722 is arranged to have a length greater than that of a radially inner portion thereof, in order to generate a pressure acting radially inward on the lubricating oil 45. Note that a plurality of oblique grooves may be arranged between radially outer portions of thrust dynamic pressure grooves. The radially outer portion of each thrust dynamic pressure groove may be arranged to have a depth greater than that of a radially inner portion thereof. Although a direction in which the lubricating oil 45 circulates has not been specified in the description of any of the above-described preferred embodiments, the direction in which the lubricating oil 45 circulates may be determined to be either a counterclockwise direction or a clockwise direction in FIG. 4.

In FIG. 4, in the case where the lower surface 421 of the upper thrust portion 42 is arranged to have a sufficient area, the upper thrust dynamic pressure groove array 721 may be arranged in a region spaced away from the communicating hole 61. Similarly, in the case where the upper surface 435 of the outer tubular portion 432 is arranged to have a sufficient area, the lower thrust dynamic pressure groove array 722 may be arranged in a region spaced away from the communicating hole 61. In the upper thrust gap 651 and the lower thrust gap 652, an upper thrust dynamic pressure groove array and a lower thrust dynamic pressure groove array may be arranged in the upper surface 521 and the lower surface 522, respectively, of the flange portion 52. Also, a radial dynamic pressure groove array may be arranged in the outer circumferential surface 411 of the shaft portion 41.

In a modification of each of the above-described preferred embodiments, the upper seal gap 661 may be arranged to have a uniform or substantially uniform width. In that case, a dynamic pressure groove array is arranged in at least one of the outer circumferential surface 422 of the upper thrust portion 42 and the inner circumferential surface 531 of the upper hub tubular portion 53 to define a so-called pumping seal. A dynamic pressure acting on the lubricating oil 45 in the direction of an interior of the upper seal gap 661 is thereby generated to retain the lubricating oil 45. The same holds true for the lower seal gap 662. Each of the upper seal portion 661a and the lower seal portion 662a may not necessarily be arranged to extend in parallel or substantially in parallel with the central axis J1, but may be arranged to be angled significantly with respect to the central axis J1.

Preferred embodiments of the present invention are applicable to motors for use in storage disk drives, and also to motors for use in any other type of devices.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor comprising:
   a stationary portion including a stator; and
   a rotating portion including a rotor magnet, and rotatably supported by the stationary portion through a lubricating oil; wherein
   the stationary portion includes:
      a shaft portion arranged to have a central axis extending in a vertical direction as a center thereof;
   the rotating portion includes:
      a sleeve portion arranged to have the shaft portion inserted therein; and a cover portion arranged to extend radially outward from the sleeve portion;

the sleeve portion includes:

a communicating hole arranged to extend through the sleeve portion;

the rotating portion includes a hole portion defined therein;

the hole portion is arranged radially outside the communicating hole; and $$V_2 < (\sigma_1/\sigma_2) \cdot V_1$$

where σ1 is a density of the sleeve portion, $V_1$ is a volume of the communicating hole, $\sigma_2$ is a density of the cover portion, and $V_2$ is a volume of the hole portion.

2. The motor according to claim 1, wherein
the hole portion is a non-through hole; and
the hole portion is arranged to extend from a lower surface of the cover portion up to a vicinity of an upper surface of the cover portion.

3. The motor according to claim 1, wherein the hole portion is arranged over the stator.

4. The motor according to claim 1, wherein
the cover portion includes a screw hole used to fix a clamper arranged to clamp a disk to an upper surface of the cover portion; and
the hole portion is closer to the central axis than is the screw hole.

5. The motor according to claim 4, further comprising a sheet member attached to a lower surface of the cover portion to close an opening of the screw hole, wherein at least a portion of the hole portion is exposed from the sheet member.

6. The motor according to claim 1, wherein
the cover portion is made of a material having a density lower than that of the sleeve portion; and
a diameter of the hole portion is arranged to be greater than a diameter of the communicating hole.

7. The motor according to claim 6, wherein the cover portion is made of aluminum, while the sleeve portion is made of stainless steel.

8. The motor according to claim 1, wherein the sleeve portion and the cover portion are defined by a single continuous member.

9. The motor according to claim 1, wherein an axial extension range of the hole portion is arranged to overlap with an axial extension range of the communicating hole.

10. The motor according to claim 1, wherein a center of the hole portion is arranged on a plane including the central axis and a center of the communicating hole, and the communicating hole and the hole portion are arranged on opposite sides of the central axis.

11. The motor according to claim 1, wherein
the stationary portion includes:
a lower plate portion arranged to extend radially outward from a lower portion of the shaft portion; and
an outer tubular portion arranged to extend upward from an outer edge portion of the lower plate portion; and
an outer circumferential surface of the shaft portion and an inner circumferential surface of the sleeve portion are arranged to together define a first gap therebetween, and an inner circumferential surface of the outer tubular portion and an outer circumferential surface of the sleeve portion are arranged to together define a second gap therebetween.

12. The motor according to claim 11, wherein a channel including the first and second gaps and the communicating hole is filled with the lubricating oil.

13. A storage disk drive comprising:
the motor of claim 1 arranged to rotate a disk;
an access portion arranged to perform at least one of reading and writing of information from or to the disk; and
a housing arranged to contain the disk, the motor, and the access portion.

14. A motor comprising:
a stationary portion including a stator; and
a rotating portion including a rotor magnet, and rotatably supported by the stationary portion through a lubricating oil; wherein
the stationary portion includes:
a shaft portion including a central axis extending in a vertical direction as a center thereof;
a lower plate portion arranged to extend radially outward from a lower portion of the shaft portion; and
an outer tubular portion arranged to extend upward from an outer edge portion of the lower plate portion;
the rotating portion includes:
a sleeve portion arranged to have the shaft portion inserted therein, and including one communicating hole arranged to extend completely there through from an upper surface to a lower surface thereof; and
a cover portion arranged to extend radially outward from the sleeve portion;
an outer circumferential surface of the shaft portion and an inner circumferential surface of the sleeve portion are arranged to together define a first gap therebetween, and an inner circumferential surface of the outer tubular portion and an outer circumferential surface of the sleeve portion are arranged to together define a second gap therebetween;
a channel including the first gap, the second gap, and the communicating hole is filled with the lubricating oil;
the cover portion includes a hole portion defined therein, an axial extension range of the hole portion being arranged to overlap with an axial extension range of the communicating hole in a radial direction;
a center of the hole portion is arranged on a plane including the central axis and a center of the communicating hole, and the communicating hole and the hole portion are arranged on opposite sides of the central axis; and
the following inequality is satisfied: $V_2 < (\sigma_1/\sigma_2) \cdot V_1$
where $\sigma_1$ is a density of the sleeve portion, $V_1$ is a volume of the communicating hole, $\sigma_2$ is a density of the cover portion, and $V_2$ is a volume of the hole portion.

15. The motor according to claim 14, wherein
the hole portion is a blind hole; and
the hole portion is arranged to extend from a lower surface of the cover portion to be adjacent to an upper surface of the cover portion.

16. The motor according to claim 14, wherein the hole portion is arranged axially over the stator.

17. The motor according to claim 14, wherein
the cover portion includes a screw hole arranged to fix a clamper arranged to clamp a disk to an upper surface of the cover portion; and
the hole portion is arranged to be closer to the central axis than the screw hole is.

18. The motor according to claim 17, further comprising a sheet member arranged to be attached to a lower surface of the cover portion to thereby close an opening of the screw hole, wherein at least a portion of the hole portion is exposed outside of the sheet member.

19. The motor according to claim 14, wherein
the cover portion is made of a material having a density lower than a density of a material of the sleeve portion; and
a diameter of the hole portion is arranged to be greater than a diameter of the communicating hole.

20. The motor according to claim 19, wherein the cover portion is made of aluminum and the sleeve portion is made of stainless steel.

21. The motor according to claim 14, wherein
the sleeve portion includes:
an inner tubular portion arranged between the shaft portion and the outer tubular portion; and
a flange portion arranged to project radially outward from the inner tubular portion on an upper side of the outer tubular portion, and including the communicating hole, the communicating hole being arranged to extend completely through the flange portion from an upper surface to a lower surface thereof; and
the cover portion is arranged to extend radially outward from the flange portion.

22. The motor according to claim 21, wherein
the first gap is defined between the outer circumferential surface of the shaft portion and an inner circumferential surface of the inner tubular portion, and the second gap is defined between the inner circumferential surface of the outer tubular portion and an outer circumferential surface of the inner tubular portion; and
an upper seal portion is arranged radially outward of the first gap, a lower seal portion is arranged radially outward of the second gap, upper and lower surfaces of the lubricating oil are arranged in the upper and lower seal portions, respectively, and the hole portion is arranged radially outward of both the upper and lower seal portions.

23. A storage disk drive comprising:
the motor of claim 14 arranged to rotate a disk;
an access portion arranged to perform at least one of reading and writing of information from or to the disk; and
a housing arranged to contain the disk, the motor, and the access portion.

* * * * *